US012809480B2

(12) United States Patent
Yamazaki et al.

(10) Patent No.: US 12,809,480 B2
(45) Date of Patent: Nov. 24, 2026

(54) ELECTRONIC DEVICE, IMAGE DISPLAY METHOD, PROGRAM, AND DISPLAY SYSTEM

(71) Applicant: SEMICONDUCTOR ENERGY LABORATORY CO., LTD., Atsugi (JP)

(72) Inventors: Shunpei Yamazaki, Tokyo (JP); Kensuke Yoshizumi, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 19/186,730

(22) Filed: Apr. 23, 2025

(65) Prior Publication Data

US 2025/0264958 A1 Aug. 21, 2025

Related U.S. Application Data

(63) Continuation of application No. 18/408,766, filed on Jan. 10, 2024, now Pat. No. 12,287,937, which is a (Continued)

(30) Foreign Application Priority Data

Sep. 6, 2016 (JP) ................................ 2016-173343

(51) Int. Cl.
*G06F 3/041* (2006.01)
*G02F 1/1333* (2006.01)
(Continued)

(52) U.S. Cl.
CPC .................. *G06F 3/041661* (2019.05); *G02F 1/133305* (2013.01); *G06F 1/1616* (2013.01);
(Continued)

(58) Field of Classification Search
CPC .... G06F 1/1605; G06F 1/1626; G06F 1/1632; G06F 1/1635; G06F 1/1641;
(Continued)

(56) References Cited

U.S. PATENT DOCUMENTS 6,750,932 B2 6/2004 Kim
7,248,235 B2 7/2007 Fujii et al.
(Continued)

FOREIGN PATENT DOCUMENTS

EP 1705557 A 9/2006
EP 1753239 A 2/2007
(Continued)

OTHER PUBLICATIONS

Chinese Office Action (Application No. 201710717614.5) DATED Nov. 18, 2022.

*Primary Examiner* — Nelson M Rosario
(74) *Attorney, Agent, or Firm* — Fish & Richardson P.C.

(57) ABSTRACT

A convenient electronic device or the like is provided. The power consumption of an electronic device or the like is reduced. An electronic device or the like having high visibility regardless of the brightness of external light is provided. An electronic device or the like that can display both a smooth moving image and an eye-friendly still image is provided. Such an electronic device is an electronic device including a first display portion, a second display portion, and a control portion. The control portion is configured to make the first display portion and the second display portion individually display two or more of a first image, a second image, and a third image at a time. The first image is displayed with reflected light, the second image is displayed with emitted light, and the third image is displayed with light including both reflected light and emitted light.

2 Claims, 24 Drawing Sheets

Related U.S. Application Data continuation of application No. 17/838,388, filed on Jun. 13, 2022, now Pat. No. 11,874,994, which is a continuation of application No. 15/685,075, filed on Aug. 24, 2017, now Pat. No. 11,360,603.

(51) Int. Cl.

| | |
|---|---|
| ***G06F 1/16*** | (2006.01) |
| ***G06F 3/01*** | (2006.01) |
| ***G09G 3/00*** | (2006.01) |
| ***G09G 3/20*** | (2006.01) |

(52) U.S. Cl.

CPC .......... *G06F 1/1626* (2013.01); *G06F 1/1637* (2013.01); *G06F 1/1643* (2013.01); *G06F 1/1647* (2013.01); *G06F 1/1649* (2013.01); *G06F 1/1654* (2013.01); *G06F 1/1669* (2013.01); *G06F 3/013* (2013.01); *G06F 3/041* (2013.01); *G06F 3/0412* (2013.01); *G09G 3/035* (2020.08); *G09G 3/2092* (2013.01); *G02F 2203/02* (2013.01); *G06F 2203/04103* (2013.01); *G09G 2330/021* (2013.01); *G09G 2330/023* (2013.01); *G09G 2354/00* (2013.01); *G09G 2356/00* (2013.01); *G09G 2380/14* (2013.01)

(58) Field of Classification Search

CPC .... G06F 1/1643; G06F 1/1647; G06F 1/1688; G06F 1/1694; G06F 1/3265; G06F 3/013; G06F 3/017; G06F 3/0488; G06F 3/1438; G06F 3/1446; G06F 2200/1634; G06F 2203/04101; G09G 5/14; G09G 2300/023; G09G 2354/00; G09G 2360/04; G09G 2370/20; Y02D 10/00

See application file for complete search history.

(56) References Cited

U.S. PATENT DOCUMENTS

| | | | | |
|---|---|---|---|---|
| 7,471,890 | B2 | 12/2008 | Lee et al. | |
| 7,634,136 | B2 | 12/2009 | Kawamoto et al. | |
| 7,860,315 | B2 | 12/2010 | Kawamoto et al. | |
| 8,138,869 | B1 | 3/2012 | Lauder et al. | |
| 8,416,365 | B1 | 4/2013 | Rosenberg et al. | |
| 8,605,005 | B2 | 12/2013 | Lee et al. | |
| 8,605,007 | B2 | 12/2013 | Lee et al. | |
| 8,624,797 | B2 | 1/2014 | Lee et al. | |
| 8,648,772 | B2 | 2/2014 | Hebenstreit et al. | |
| 8,988,876 | B2 | 3/2015 | Corbin et al. | |
| 9,013,458 | B2 | 4/2015 | Cho et al. | |
| 9,142,593 | B2 * | 9/2015 | Okano .................. | H10H 29/14 |
| 9,298,035 | B2 | 3/2016 | Yamazaki et al. | |
| 9,323,324 | B2 | 4/2016 | Kim | |
| 9,335,793 | B2 | 5/2016 | Rothkopf | |
| 9,494,980 | B2 | 11/2016 | Corbin et al. | |
| 9,684,393 | B2 | 6/2017 | Yagihashi et al. | |
| 9,804,635 | B2 | 10/2017 | Kim et al. | |
| 9,886,150 | B2 | 2/2018 | Yamamoto et al. | |
| 9,933,933 | B2 | 4/2018 | Han et al. | |
| 10,037,054 | B2 | 7/2018 | Corbin et al. | |
| 10,142,547 | B2 | 11/2018 | Yamazaki et al. | |
| 10,303,215 | B2 | 5/2019 | Corbin et al. | |
| 10,452,218 | B2 | 10/2019 | Yamamoto et al. | |
| 10,488,883 | B2 | 11/2019 | Rothkopf | |
| 10,678,424 | B2 | 6/2020 | Han et al. | |
| 10,712,777 | B2 | 7/2020 | Corbin et al. | |
| 10,771,705 | B2 | 9/2020 | Yamazaki et al. | |
| 10,916,363 | B2 | 2/2021 | Lauder et al. | |
| 10,963,156 | B2 | 3/2021 | Han et al. | |
| 11,068,152 | B2 | 7/2021 | Han et al. | |
| 11,360,603 | B2 | 6/2022 | Yamazaki et al. | |
| 11,846,963 | B2 | 12/2023 | Yamazaki et al. | |
| 2004/0027315 | A1 | 2/2004 | Senda et al. | |
| 2004/0252076 | A1 | 12/2004 | Kodama | |
| 2006/0022910 | A1 | 2/2006 | Sekiya et al. | |
| 2007/0176847 | A1 | 8/2007 | Shah et al. | |
| 2007/0242031 | A1 | 10/2007 | Kimura et al. | |
| 2010/0026632 | A1 | 2/2010 | Ishida et al. | |
| 2010/0118065 | A1 | 5/2010 | Song et al. | |
| 2010/0207903 | A1 | 8/2010 | Kim et al. | |
| 2010/0231501 | A1 | 9/2010 | Mun et al. | |
| 2010/0333006 | A1 | 12/2010 | Ostergard et al. | |
| 2011/0032231 | A1 | 2/2011 | Maruyama et al. | |
| 2011/0043435 | A1 | 2/2011 | Hebenstreit et al. | |
| 2011/0157254 | A1 | 6/2011 | Yamazaki et al. | |
| 2011/0199404 | A1 | 8/2011 | Umezaki et al. | |
| 2012/0026434 | A1 | 2/2012 | Chen | |
| 2012/0146891 | A1 | 6/2012 | Kalinli | |
| 2012/0208637 | A1 | 8/2012 | Hirakata | |
| 2012/0288139 | A1 | 11/2012 | Singhar | |
| 2013/0162606 | A1 | 6/2013 | Araumi | |
| 2013/0278800 | A1 | 10/2013 | Liu | |
| 2014/0210737 | A1 | 7/2014 | Hwang et al. | |
| 2014/0226275 | A1 | 8/2014 | Ko et al. | |
| 2014/0268276 | A1 | 9/2014 | Hu et al. | |
| 2014/0292741 | A1 | 10/2014 | Yamazaki et al. | |
| 2015/0035777 | A1 | 2/2015 | Hirakata et al. | |
| 2015/0220299 | A1 | 8/2015 | Kim et al. | |
| 2015/0261259 | A1 * | 9/2015 | Endo .................... | G06F 3/0446<br>361/679.06 |
| 2016/0012783 | A1 | 1/2016 | Kimura et al. | |
| 2016/0041428 | A1 | 2/2016 | Hirakata et al. | |
| 2016/0042696 | A1 | 2/2016 | Hirakata et al. | |
| 2016/0042702 | A1 | 2/2016 | Hirakata et al. | |
| 2016/0210910 | A1 | 7/2016 | Yamazaki et al. | |
| 2016/0283028 | A1 | 9/2016 | Yamazaki et al. | |
| 2016/0299387 | A1 | 10/2016 | Yamazaki et al. | |
| 2016/0313769 | A1 | 10/2016 | Yoshitani et al. | |
| 2016/0329032 | A1 | 11/2016 | Tsujimoto | |
| 2017/0040402 | A1 | 2/2017 | Yasumoto et al. | |
| 2017/0082882 | A1 | 3/2017 | Hirakata et al. | |
| 2017/0082887 | A1 | 3/2017 | Kubota et al. | |
| 2017/0090246 | A1 | 3/2017 | Seo et al. | |
| 2017/0098689 | A1 | 4/2017 | Ikeda et al. | |
| 2017/0102598 | A1 | 4/2017 | Nakada et al. | |
| 2017/0103697 | A1 | 4/2017 | Kawashima et al. | |
| 2017/0103714 | A1 | 4/2017 | Yamamoto et al. | |
| 2017/0104049 | A1 | 4/2017 | Nakamura et al. | |
| 2017/0116929 | A1 | 4/2017 | Hirakata | |
| 2017/0123268 | A1 | 5/2017 | Sasaki et al. | |
| 2017/0131594 | A1 | 5/2017 | Nakada et al. | |
| 2017/0139253 | A1 | 5/2017 | Hirakata et al. | |
| 2017/0153695 | A1 | 6/2017 | Kawashima et al. | |
| 2017/0176791 | A1 | 6/2017 | Kubota et al. | |
| 2017/0177116 | A1 | 6/2017 | Jinbo et al. | |
| 2017/0205925 | A1 | 7/2017 | Yamazaki et al. | |
| 2018/0011676 | A1 | 1/2018 | Han et al. | |
| 2021/0132653 | A1 | 5/2021 | Yamazaki et al. | |
| 2024/0094768 | A1 | 3/2024 | Yamazaki et al. | |

FOREIGN PATENT DOCUMENTS

| | | | |
|---|---|---|---|
| EP | 2265012 | A | 12/2010 |
| EP | 2309768 | A | 4/2011 |
| EP | 2439611 | A | 4/2012 |
| EP | 2892050 | A | 7/2015 |
| JP | 07-146845 | A | 6/1995 |
| JP | 2001-005438 | A | 1/2001 |
| JP | 2001-272965 | A | 10/2001 |
| JP | 2002-169190 | A | 6/2002 |
| JP | 2003-076302 | A | 3/2003 |
| JP | 2003-157026 | A | 5/2003 |
| JP | 2004-302321 | A | 10/2004 |
| JP | 2006-208522 | A | 8/2006 |
| JP | 2006-268432 | A | 10/2006 |
| JP | 2007-053760 | A | 3/2007 |
| JP | 2007-102360 | A | 4/2007 |
| JP | 2007-232882 | A | 9/2007 |
| JP | 2008-225381 | A | 9/2008 |
| JP | 2013-502616 | | 1/2013 |
| JP | 2014-048520 | A | 3/2014 |

(56) References Cited

FOREIGN PATENT DOCUMENTS

| | | | |
|---|---|---|---|
| JP | 2014-512552 | | 5/2014 |
| JP | 2015-230632 | A | 12/2015 |
| JP | 6943689 | | 10/2021 |
| KR | 2011-0038980 | A | 4/2011 |
| KR | 2012-0043004 | A | 5/2012 |
| KR | 2012-0056936 | A | 6/2012 |
| KR | 2015-0032054 | A | 3/2015 |
| KR | 2015-0141083 | A | 12/2015 |
| KR | 2016-0029708 | A | 3/2016 |
| KR | 2016-0091409 | A | 8/2016 |
| TW | 201207534 | | 2/2012 |
| WO | WO-2011/022546 | | 2/2011 |
| WO | WO-2011/081011 | | 7/2011 |
| WO | WO-2015/079356 | | 6/2015 |

* cited by examiner

FIG. 10A
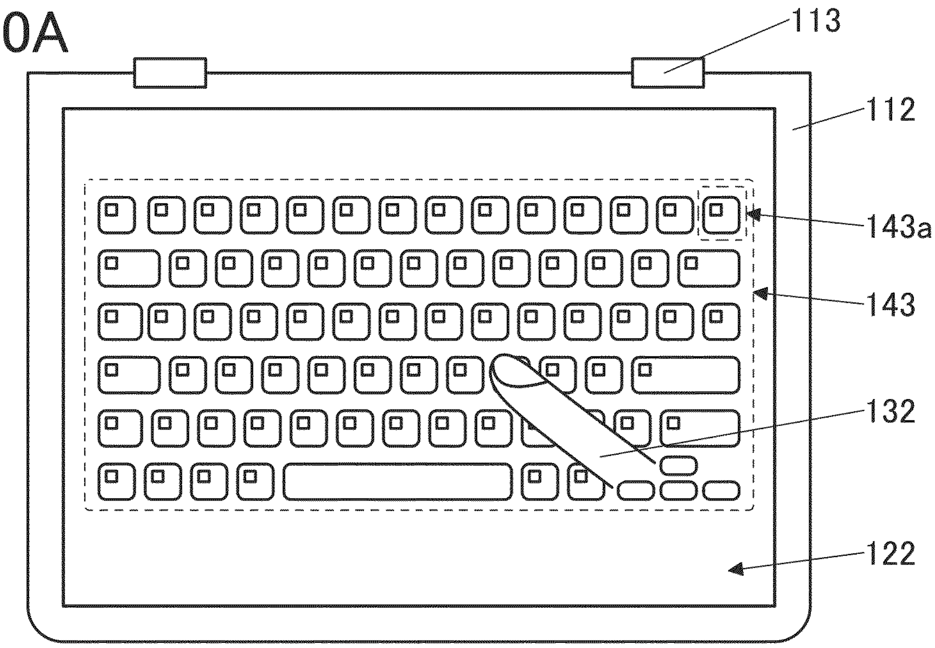
FIG. 10B1
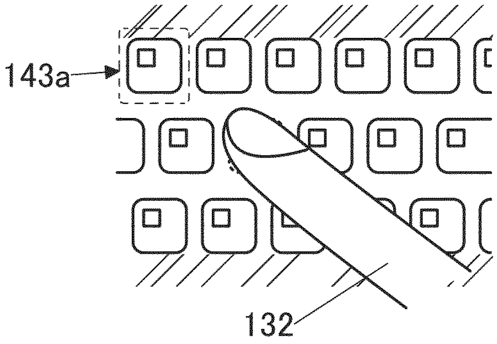
FIG. 10B2
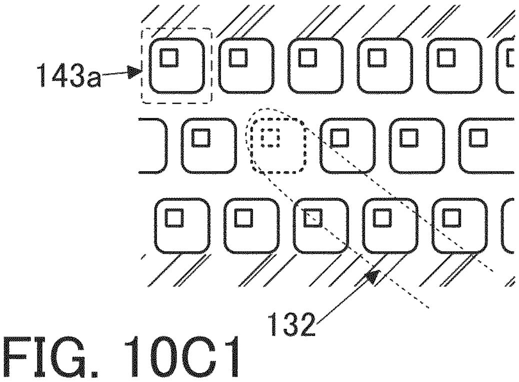
FIG. 10B3
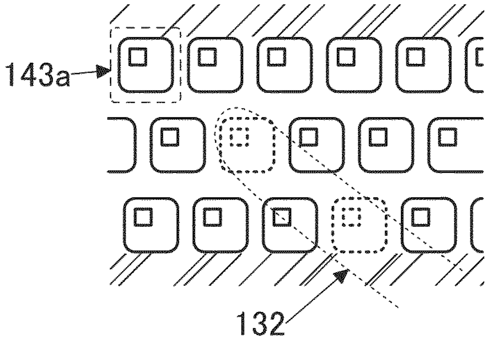
FIG. 10C1
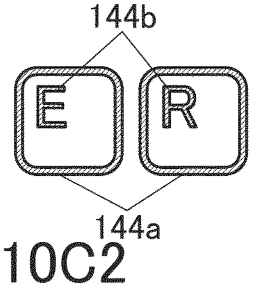
FIG. 10C2
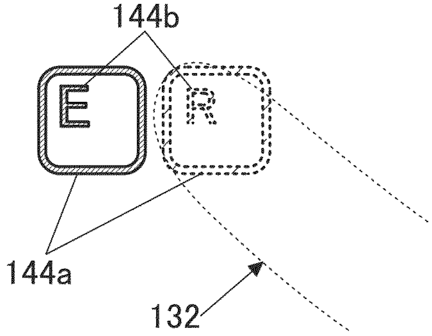

FIG. 13A1
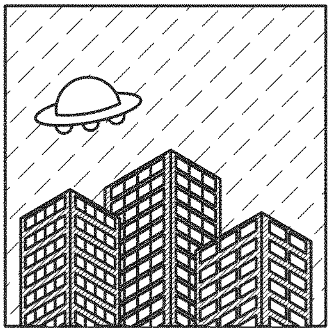
FIG. 13A2
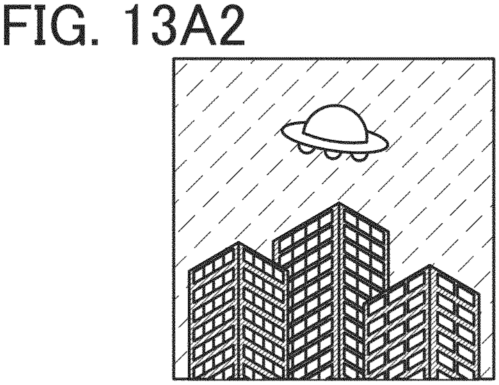
FIG. 13A3
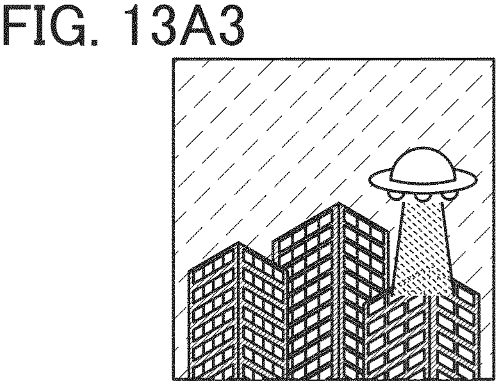

FIG. 15A
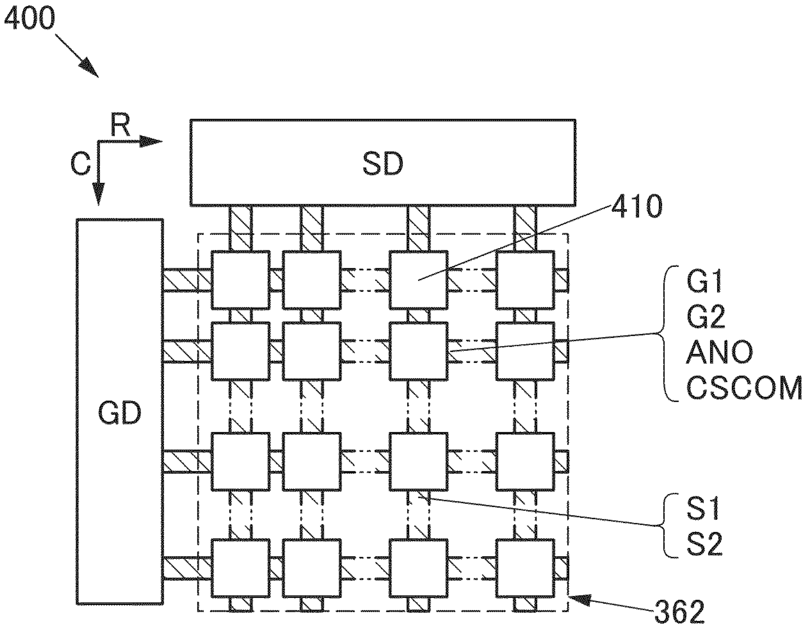
FIG. 15B1
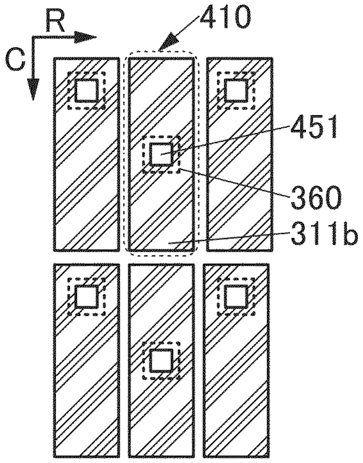
FIG. 15B2
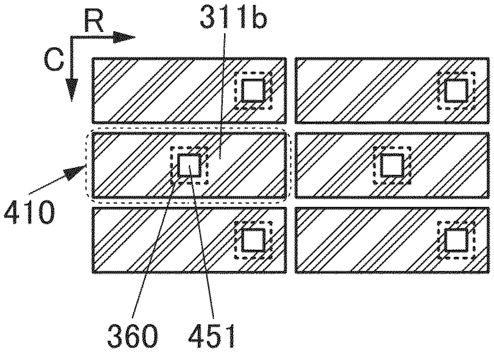

ELECTRONIC DEVICE, IMAGE DISPLAY METHOD, PROGRAM, AND DISPLAY SYSTEM

CROSS-REFERENCE TO RELATED APPLICATIONS

This application is a continuation of U.S. application Ser. No. 18/408,766, filed Jan. 10, 2024, now allowed, which is a continuation of U.S. application Ser. No. 17/838,388, filed Jun. 13, 2022, now U.S. Pat. No. 11,874,994, which is a continuation of U.S. application Ser. No. 15/685,075, filed Aug. 24, 2017, now U.S. Pat. No. 11,360,603, which claims the benefit of a foreign priority application filed in Japan as Serial No. 2016-173343 on Sep. 6, 2016, all of which are incorporated by reference.

BACKGROUND OF THE INVENTION

1. Field of the Invention

One embodiment of the present invention relates to an electronic device. One embodiment of the present invention relates to an image display method and a program pertaining to the image display method. One embodiment of the present invention relates to a display system.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

2. Description of the Related Art

Electronic devices including display devices have recently been diversified. Examples of the electronic devices include cellular phones, smartphones, tablet terminals, and wearable devices.

Other examples of the electronic devices include e-book readers. Unlike tablet terminals and the like, e-book readers mainly specialize in displaying text data. For example, while tablet terminals include liquid crystal panels or the like that can display smooth moving images, some e-book readers include electronic paper that can display still images with low power consumption.

For example, Patent Document 1 has proposed active matrix electronic paper including a transistor as a switching element of a pixel, and a ring binder e-book reader including the electronic paper.

PATENT DOCUMENT

[Patent Document 1] Japanese Published Patent Application No. 2002-169190

SUMMARY OF THE INVENTION

An object of one embodiment of the present invention is to provide a convenient electronic device or the like. Another object is to reduce power consumption of an electronic device or the like. Another object is to provide an electronic device or the like having high visibility regardless of the brightness of external light. Another object is to provide an electronic device or the like that can display both a smooth moving image and an eye-friendly still image. Another object is to provide a novel electronic device or the like.

One embodiment of the present invention is an electronic device including a first display portion, a second display portion, and a control portion. The control portion is configured to make the first display portion and the second display portion individually display two or more of a first image, a second image, and a third image at a time. The first image is displayed with reflected light, the second image is displayed with emitted light, and the third image is displayed with light including both reflected light and emitted light.

Another embodiment of the present invention is an electronic device including a first housing having a first display portion, a second housing having a second display portion, and a control portion. The first housing and the second housing are joined together to be capable of deforming in a mode of being folded with the first display portion and the second display portion overlapping with each other and in a mode of being opened with the first display portion and the second display portion exposed. The control portion is configured to make the first display portion and the second display portion individually display two or more of a first image, a second image, and a third image at a time. The first image is displayed with reflected light, the second image is displayed with emitted light, and the third image is displayed with light including both reflected light and emitted light.

In the above electronic device, the first housing and the second housing joined together are preferably detachable from each other.

In the above electronic device, the second display portion is preferably configured to serve as a touch sensor, and the control portion is preferably configured to make the first display portion display document data and make the second display portion, when the touch sensor detects a user input, display input data.

In the above electronic device, the second display portion is preferably configured to serve as a touch sensor. When no user input is detected, the control portion preferably makes the second display portion display the second image or the third image, and when a user input is detected, the control portion preferably makes a detection position in the second display portion display the first image.

In the above electronic device, the second display portion is preferably configured to serve as a touch sensor. When no user input is detected, the control portion preferably makes the second display portion display a plurality of object data as the second image or the third image, and when a user input is detected, the control portion preferably makes a detection position in the second display portion display object data at the detection position as the first image.

In the above electronic device, the first display portion or the second display portion preferably includes a view point detection portion that detects a first region at which a user looks fixedly and outputs positional data of the first region to the control portion. Here, the control portion preferably makes the first region display the second image or the third image and makes a second region other than the first region display the first image, on the basis of the positional data.

The above electronic device preferably includes an image-capture portion that is configured to capture an image and output first image data of the image captured. The control portion is preferably configured to combine the first image data and virtual object data to synthesize second image data. Here, the control portion preferably makes the virtual object data be displayed as the second image or the third image and a remaining region other than the virtual object data be displayed as the first image in the first display portion or the second display portion, on the basis of the second image data.

Another embodiment of the present invention is an image display method including a step of making two display portions individually display at a time two or more of a first image displayed with reflected light, a second image displayed with emitted light, and a third image displayed with light including both reflected light and emitted light.

Another embodiment of the present invention is a program for making a computer serve as a control portion for making two display portions individually display at a time two or more of a first image displayed with reflected light, a second image displayed with emitted light, and a third image displayed with light including both reflected light and emitted light.

Another embodiment of the present invention is a display system including a first display device, a second display device, and a control device. Each of the first display device and the second display device includes a first display element configured to display an image with reflected light and a second display element configured to display an image with emitted light. The control device is configured to make the first display device and the second display device individually display at a time two or more of a first image displayed only by the first display element, a second image displayed only by the second display element, and a third image displayed by both the first display element and the second display element.

With one embodiment of the present invention, a convenient electronic device or the like can be provided. Alternatively, the power consumption of an electronic device or the like can be reduced. Alternatively, an electronic device or the like having high visibility regardless of the brightness of external light can be provided. Alternatively, an electronic device or the like that can display both a smooth moving image and an eye-friendly still image can be provided. Alternatively, a novel electronic device or the like can be provided.

BRIEF DESCRIPTION OF THE DRAWINGS

FIGS. 10A, 10B1, 10B2, 10B3, 10C1, and 10C2 illustrate an example of an image display method.

FIGS. 13A1 to 13A3 illustrate a specific display example.

FIG. 15A illustrates a circuit of a display device and FIGS. 15B1 and 15B2 are top views of pixels.

DETAILED DESCRIPTION OF THE INVENTION

Figure 1A:
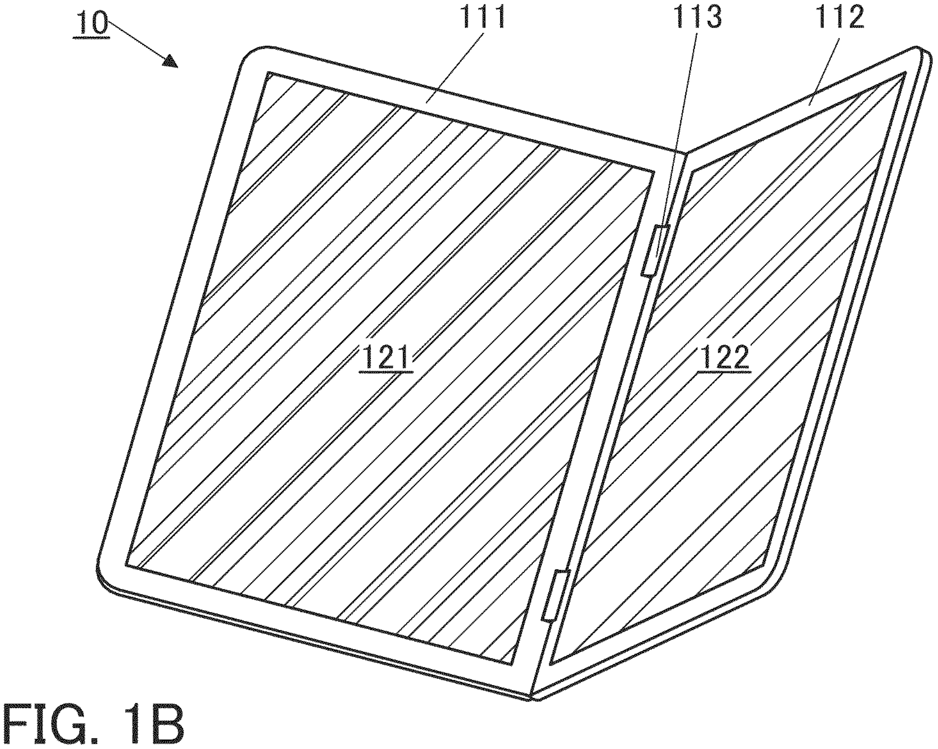
FIGS. 1A to 1C show a structure example of an electronic device.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments and example.

Note that in structures of the present invention described below, the same portions or portions having similar functions are denoted by the same reference numerals in different drawings, and a description thereof is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as “first,” “second,” and the like are used in order to avoid confusion among components and do not limit the number.

Embodiment 1

An electronic device of one embodiment of the present invention described below as an example includes two display portions and a control portion that controls image display in the two display portions.

In addition, the invention disclosed below includes an image display method, a program for making a computer control image display, and a display system having a display device capable of displaying an image and a control device for controlling the display device.

The electronic device of one embodiment of the present invention includes a first housing having a first display portion and a second housing having a second display portion. The control portion is provided in the first housing or the second housing. Note that the control portion may be provided outside the first housing or the second housing.

The first housing and the second housing are preferably joined together to be deformable. Specifically, the two housings are preferably jointed together to be reversibly deformable in a mode of being folded with the first display portion and the second display portion facing and overlapping with each other and in a mode of being opened with the first display portion and the second display portion exposed. Furthermore, the two housings are preferably joined together to be deformable in a mode of being folded with the first display portion and the second display portion being back to back.

The electronic device with such a structure is highly portable in a mode where the first and second housings are folded, while highly browsable in a mode where the housings are opened, owing to a wide display region with the two display portions.

At least one of display devices (e.g., display panels or display modules) that form the first and second display portions preferably has a function as a touch sensor. In this case, an intuitive user input with a touch operation or a stylus can be achieved.

The first display portion and the second display portion each preferably employ a display device including both a reflective element and a light-emitting element. It is further preferable to employ a display device capable of displaying an image only with a reflective element, displaying an image only with a light-emitting element, and displaying an image with both the reflective element and the light-emitting element.

Accordingly, image display can be performed by the reflective element with low power consumption in bright external light, while image display can be performed vividly by the light-emitting element in poor external light. The combination display of the reflective element and the light-emitting element can reduce power consumption and allows an image to be displayed vividly.

Here, two or more kinds of the above images are preferably capable of being displayed at a time in a display region of the first or second display portion. For example, a display region of the first or second display portion in the display device is preferably capable of displaying, at a time, two or more of a first image displayed only by the reflective element, a second image displayed only by the light-emitting element, and a third image displayed by both the reflective element and the light-emitting element.

For example, when an image is displayed in the display region of the first or second display portion by the control portion, the above-mentioned structure enables a reduction in power consumption by making the first image, displayed only with the reflective element, be displayed in a portion for displaying background information for which emphasized display is not desired, a portion at which a user does not look fixedly, a portion where a user cannot see, or the like. The second or third image, displayed with the light-emitting element, is displayed in a portion where emphasized display is desired, a portion at which a user looks fixedly, or the like, which increases contrast in the portion and improves visibility.

That is, in one embodiment of the present invention, display only with reflected light, display only with emitted light, and display with both reflected light and emitted light can be separately used in a display region of the first or second display portion.

[Structure Example]

More specific examples of the electronic device of one embodiment of the present invention are described below with reference to the drawings.

FIG. 1A is a perspective view of an electronic device 10. The electronic device 10 includes a housing 111, a housing 112, and hinges 113. The housing 111 includes a display portion 121, and the housing 112 includes a display portion 122.

The housings 111 and 112 are joined together with the hinges 113. The housings 111 and 112 can be relatively rotated with the use of the hinges 113.

As described later, the housings 111 and 112 are preferably detachable.

Figure 1B:
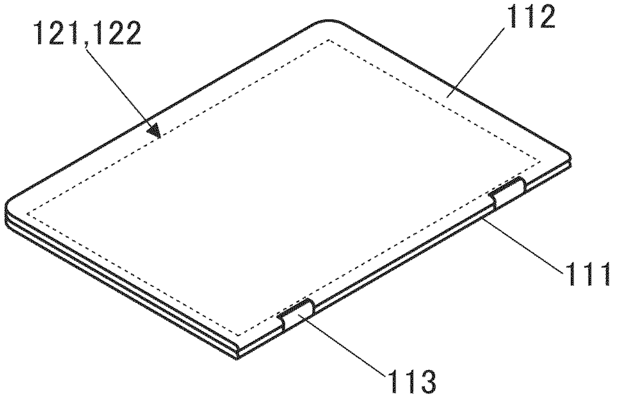
Figure 1C:
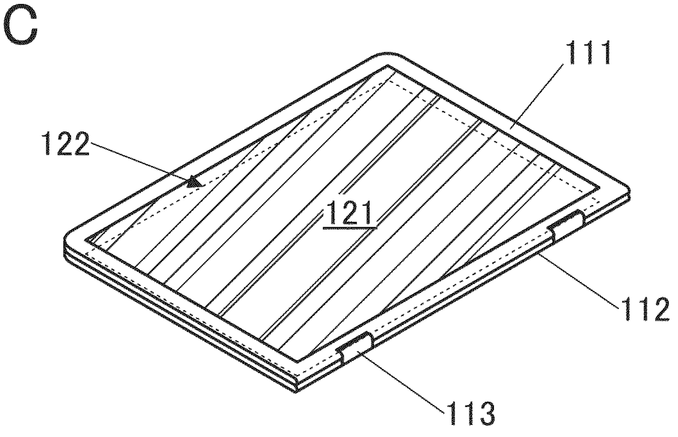

FIG. 1A shows an opened mode where the display portions 121 and 122 are exposed. FIG. 1B shows a mode where the housings 111 and 112 are folded so that the display portions 121 and 122 face and overlap with each other. FIG. 1C shows a mode where the housings 111 and 112 are folded so that the display portions 121 and 122 are back to back. The electronic device 10 can deform reversibly from the mode shown in FIG. 1B to the mode shown in FIG. 1C through the mode shown in FIG. 1A.

Each of the display portions 121 and 122 can employ a display device (alternatively, a display panel or a display module) including a reflective display element and a light-emitting element.

[Block Diagram 1]

Figure 2:
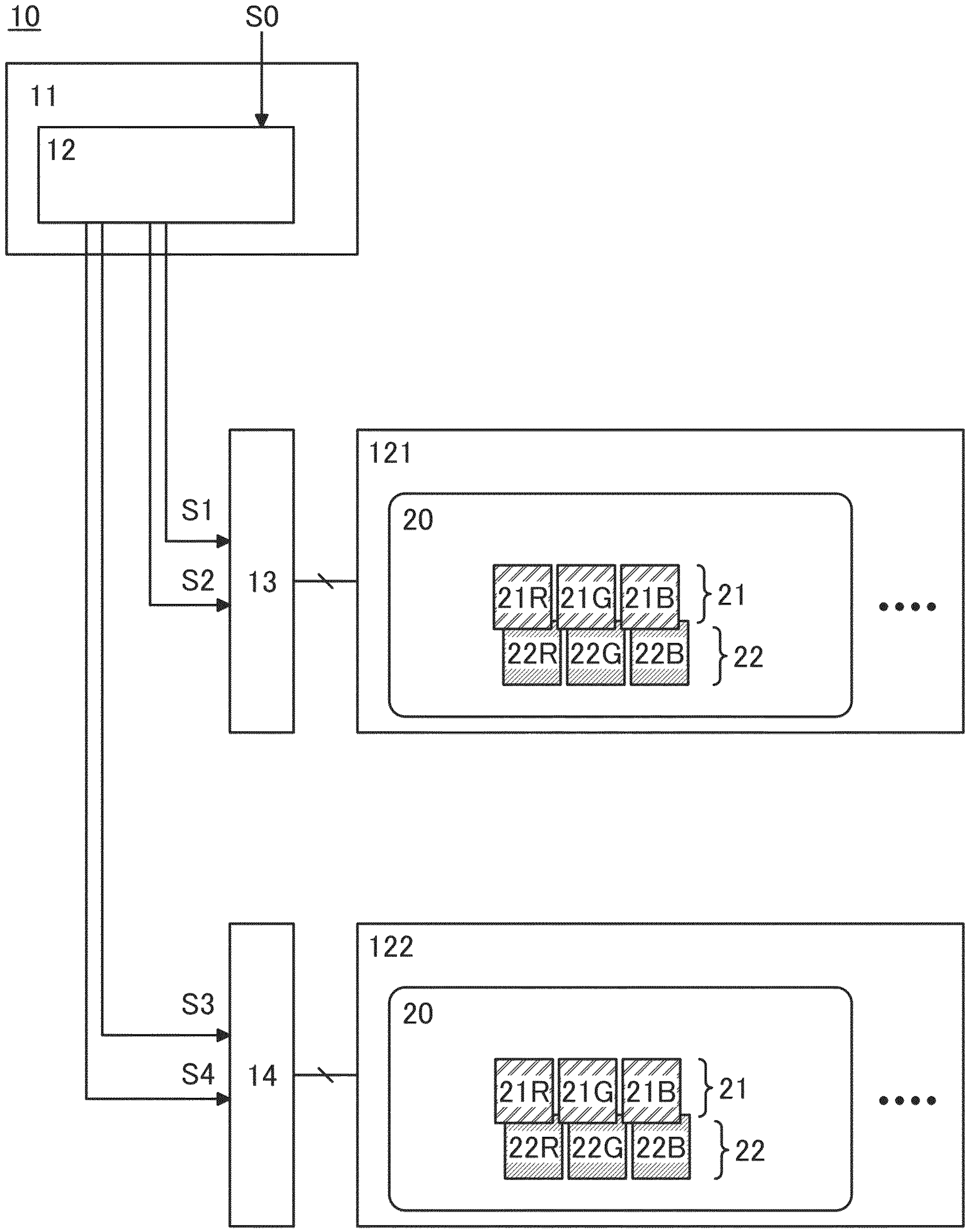
FIG. 2 shows a structure example of an electronic device.

FIG. 2 is a block diagram of the electronic device 10. The electronic device 10 includes a control portion 11, a driver portion 13, a driver portion 14, the display portion 121, and the display portion 122. The control portion 11 includes an arithmetic portion 12.

The display portions 121 and 122 each include a plurality of pixel units 20 arranged in a matrix. The pixel unit 20 includes a first pixel 21 and a second pixel 22.

FIG. 2 shows an example where the first pixel 21 and the second pixel 22 each include display elements corresponding to three colors of red (R), green (G), and blue (B).

The first pixel 21 includes a display element 21R corresponding to red (R), a display element 21G corresponding to green (G), and a display element 21B corresponding to blue (B). The display elements 21R, 21G, and 21B each utilize reflection of external light.

The second pixel 22 includes a display element 22R corresponding to red (R), a display element 22G corresponding to green (G), and a display element 22B corresponding to blue (B). The display elements 22R, 22G, and 22B each utilize light of a light source.

The driver portion 13 includes a circuit for driving the plurality of pixel units 20 in the display portion 121 and the driver portion 14 includes a circuit for driving the plurality of pixel units 20 in the display portion 122. Specifically, the driver portions 13 and 14 each supply a signal including a gray level, a scan signal, a power supply potential, and the like to the first pixel 21 and the second pixel 22 included in the pixel unit 20. The driver portions 13 and 14 include a signal line driver circuit and a scan line driver circuit, for example.

A video signal S0 including image data is input from the outside to the control portion 11. The control portion 11 generates four signals (signals S1, S2, S3, and S4) including gray levels to be supplied to the pixel units 20 in the display portions 121 and 122, and outputs the signals to the driver portions 13 and 14. The control portion 11 generates a timing signal such as a clock signal or a start pulse signal in addition to the signals S1, S2, S3 and S4, and outputs them to the driver portions 13 and 14.

The signals S1 and S3 each include gray levels supplied to the first pixel 21 in the pixel unit 20. Here, the signals S1 and S3 each include data of three gray levels supplied to the display elements 21R, 21G, and 21B per pixel unit 20.

The signals S2 and S4 each include gray levels supplied to the second pixel 22 in the pixel unit 20. Here, the signals S2 and S4 each include data of three gray levels supplied to the display elements 22R, 22G, and 22B per pixel unit 20.

The signals S1, S2, S3, and S4 each may be a serial signal transmitted through one signal line or a parallel signal transmitted through a plurality of signal lines.

As shown in FIG. 2, the control portion 11 has a function of supplying signals to the display portions 121 and 122 individually. Therefore, the display portions 121 and 122 can be separately controlled. For example, one of the display portions 121 and 122 displays an image, while the other does not display an image.

The control portion 11 can supply the signals S1 and S2 (or the signals S3 and S4) to the display portion 121 (or the display portion 122) so that the first pixel 21 and the second pixel 22 in the pixel unit 20 are driven separately. Therefore, display in each of the display portions 121 and 122 can include two or more of the following portions: a portion displayed only with the first pixel 21, a portion displayed only with the second pixel 22, a portion displayed with both the first pixel 21 and the second pixel 22, and a portion with no display.

The arithmetic portion 12 can include a microprocessor such as a graphics processing unit (GPU), for example. Such a microprocessor may be obtained with a programmable logic device (PLD) such as a field programmable gate array (FPGA) or a field programmable analog array (FPAA).

The video signal S0 may be generated by a central processing unit (CPU) or the like provided separately from the electronic device 10 and be supplied to the control portion 11. Alternatively, the arithmetic portion 12 may serve as a CPU and have a function of generating the video signal S0.

The video signal S0 input from the outside may be a signal that has already been subjected to gamma correction. The arithmetic portion 12 may have a function of performing the correction. The arithmetic portion 12 may generate the signals S1, S2, S3, and S4 based on a signal resulting from correction to the video signal S0 or may correct each of the generated signals S1, S2, S3 and S4.

With the use of a processor, the arithmetic portion 12 interprets and executes instructions from programs, to process various kinds of data and control programs. Programs that can be executed by the processor may be stored in a memory region of the processor or in another memory.

The arithmetic portion 12 may include a main memory. The main memory can include a volatile memory, such as a random access memory (RAM), and a nonvolatile memory, such as a read only memory (ROM).

For example, a dynamic random access memory (DRA M) is used for the RAM, in which case a memory space as a workspace for the arithmetic portion 12 is virtually allocated and used. An operating system, an application program, a program module, program data, and the like stored in a memory device provided outside are loaded into the RAM and executed. The data, program, and program module that are loaded into the RAM are directly accessed and operated by the arithmetic portion 12.

The control portion 11 may be mounted on a circuit board such as a printed circuit, and the driver portions 13 and 14 may be provided over a substrate including the display portion 121 and a substrate including the display portion 122, respectively. Here, the circuit board and the driver portion 13 (or 14) are connected to each other via a flexible printed circuit (FPC) or the like. Furthermore, the driver portion 13 (or 14) may be formed over a substrate including the display portion 121 (or 122) through the same step as that for transistors and the like included in the display portion 121 (or 122). Alternatively, part or all of the driver portion 13 (or 14) may be mounted on the substrate as an integrated circuit (IC). Alternatively, one or a plurality of ICs serving as the control portion 11 and the driver portion 13 (or 14) may be mounted on the substrate. Alternatively, the control portion 11 and the driver portion 13 (or 14) may be formed over the substrate including the display portion 121 (or 122) through the same step as that for transistors included in the display portion 121 (or 122).

[Structure Example of Display Device]

A display device that can be used for the display portions 121 and 122 will be described below.

The display device of one embodiment of the present invention can include a pixel in which a first display element that reflects visible light is provided. Alternatively, the display device can include a pixel in which a second display element that emits visible light is provided. Alternatively, the display device can include a pixel in which a third display element that transmits visible light is provided. Alternatively, the display device can include a pixel in which the first display element and one of the second and third display elements are provided.

In this embodiment, a display device including the first display element that reflects visible light and the second display element that emits visible light is described.

The display device has a function of displaying an image with the use of one or both of first light reflected by the first display element and second light emitted by the second display element. Alternatively, the display device has a function of expressing gray scales by individually controlling the amount of first light reflected by the first display element and the amount of second light emitted by the second display element.

It is preferable that the display device have a structure including a first pixel expressing gray scales by controlling the amount of light reflected by the first display element and a second pixel expressing gray scales by controlling the amount of light emitted by the second display element. For example, the first pixels are arranged in a matrix and the second pixels are arranged in a matrix to form a display portion.

The number of the first pixels is preferably the same as that of the second pixels, and the first pixels and the second pixels are preferably arranged in a display region with the same pitch. Here, the first pixel and the second pixel adjacent to each other can be collectively referred to as a pixel unit. Thus, as described later, an image displayed by a plurality of first pixels, an image displayed by a plurality of second pixels, and an image displayed by both the plurality of first pixels and the plurality of second pixels can be displayed in the same display region.

As the first display element included in the first pixel, an element that performs display by reflecting external light can be used. Such an element does not include a light source and thus power consumption in display can be significantly reduced.

As the first display element, a reflective liquid crystal element can be typically used. Alternatively, the first display element can be, for example, a Micro Electro Mechanical Systems (MEMS) shutter element, an optical interference MEMS element, or an element using a microcapsule method, an electrophoretic method, an electrowetting method, an Electronic Liquid Powder (registered trademark) method, or the like.

As the second display element included in the second pixel, an element performing display with the use of light from a light source in the element can be used. Specifically, it is preferable to use an electroluminescence element where light can be extracted from a light-emitting substance by application of an electric field. Since the luminance and the chromaticity of light emitted from such a pixel are not affected by external light, an image with high color reproducibility (a wide color gamut) and a high contrast, i.e., a clear image, can be displayed.

The second display element can be a self-luminous light-emitting element such as an organic light-emitting diode (OLED), a light-emitting diode (LED), a quantum-dot light-emitting diode (QLED), or a semiconductor laser. Alternatively, the display element in the second pixel may be formed by a combination of a backlight that is a light source and a transmissive liquid crystal element that controls the amount of light transmitted from the backlight. The backlight is preferably an edge-light backlight with an LED light source that facilitates a reduction in the thickness of the display device with ease.

The first pixel can include, for example, a subpixel exhibiting light of white (W), or subpixels respectively exhibiting light of three colors of red (R), green (G), and blue (B). Similarly, the second pixel can include, for example, a subpixel exhibiting light of white (W), or subpixels respectively exhibiting light of three colors of red (R), green (G), and blue (B). Note that the first pixel and the second pixel may each include subpixels of four colors or more. The increased number of subpixels leads to a reduction in power consumption and improvement in color reproducibility.

In one embodiment of the present invention, a first mode in which an image is displayed by the first pixels, a second mode in which an image is displayed by the second pixels, and a third mode in which an image is displayed by the first pixels and the second pixels can be switched.

Hereinafter, the image displayed in the first mode, the image displayed in the second mode, and the image displayed in the third mode are sometimes referred to as a first image, a second image, and a third image, respectively.

The first mode is a mode in which an image is displayed utilizing light reflected from the first display element. The first mode does not require a light source and thus is a driving mode with extremely low power consumption. The first mode is effective in the case where, for example, external light has a sufficiently high illuminance and is white light or light near white light. The first mode is a display mode appropriate for displaying text data of a book or a document, for example. The use of reflected light enables eye-friendly display, thereby mitigating eye fatigue.

The second mode is a mode in which an image is displayed utilizing light emitted from the second display element. Thus, an extremely clear image (with high contrast and high color reproducibility) can be displayed regardless of the illuminance and chromaticity of external light. For example, the second mode is effective in the case where the illuminance of external light is extremely low, e.g., during the night or in a dark room. When a bright image is displayed under weak external light, a user may feel that the image is too bright. To prevent this, an image with a reduced luminance is preferably displayed in the second mode. This prevents too bright display and reduces power consumption. The second mode is a mode suitable for displaying a clear image and a smooth moving image.

The third mode is a mode in which display is performed using both light reflected from the first display element and light emitted from the second display element. Specifically, the display device is driven so that light casted by the first pixel and light emitted from the second pixel adjacent to the first pixel are mixed to express one color. The third mode can offer a clearer image display than the first mode and consume lower power than the second mode. For example, the third mode is effective when the illuminance of external light is relatively low such as under indoor illumination or in the morning or evening, or when the external light does not represent a white chromaticity. Furthermore, the use of light obtained by mixing reflected light and emitted light makes it possible to display an image that gives a viewer the impression of seeing a picture.

Figure 3A:
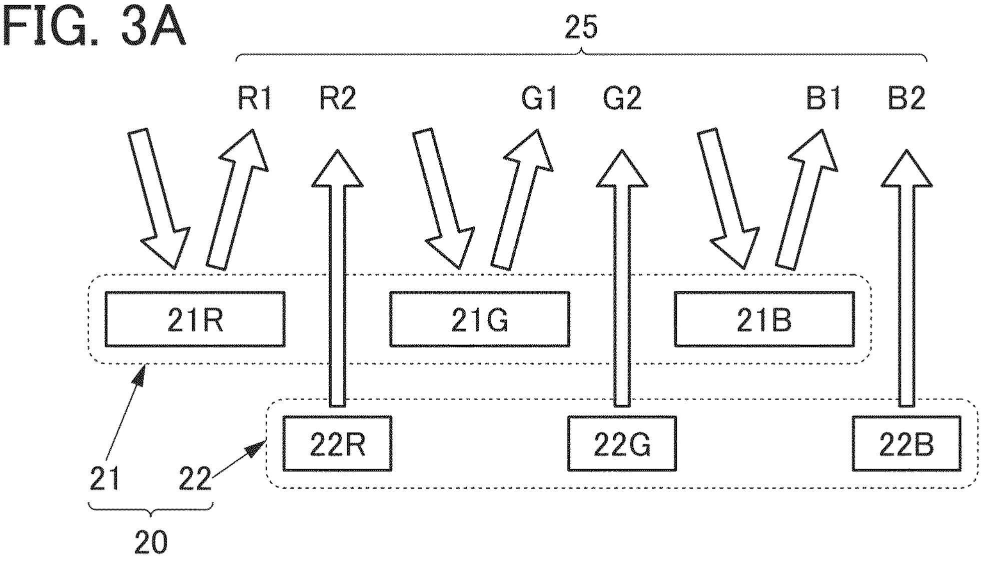
FIGS. 3A to 3C show a structure example of an electronic device.
Figure 3B:
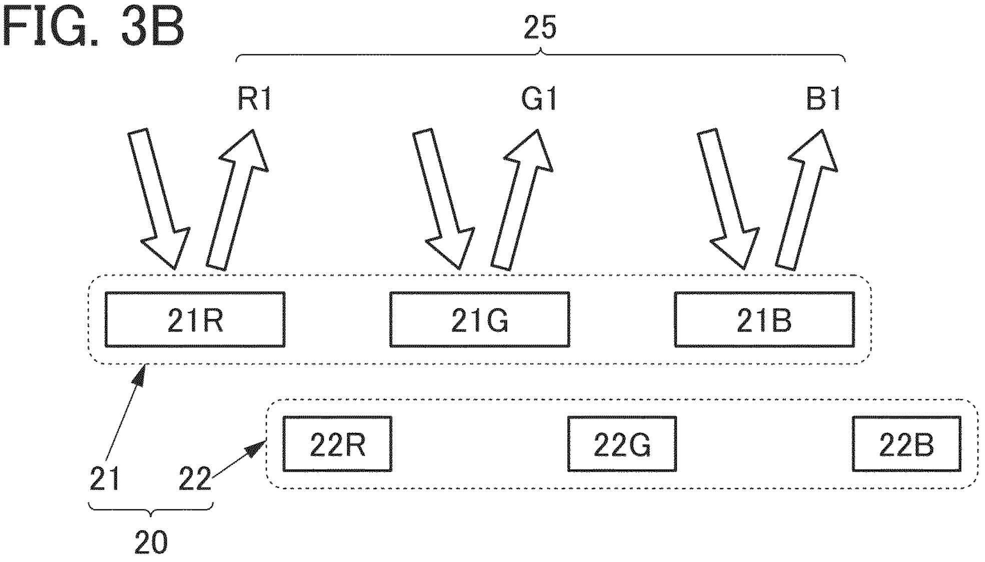
Figure 3C:
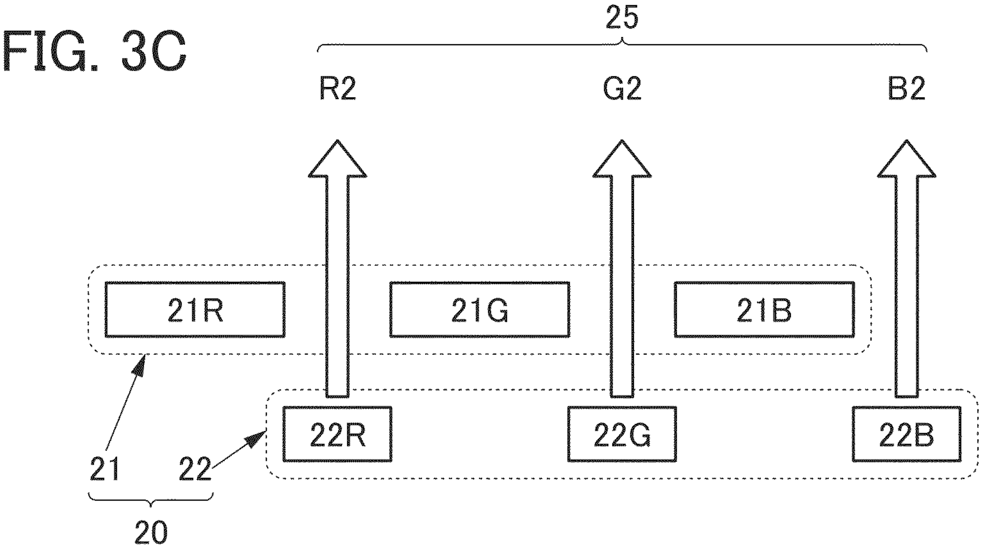

Next, the pixel unit 20 is explained with reference to FIGS. 3A to 3C. FIGS. 3A to 3C are schematic views illustrating a structure example of the pixel unit 20.

The first pixel 21 includes the display elements 21R, 21G, and 21B. The display element 21R reflects external light and casts red light R1 to the display surface side; the red light R1 has a luminance according to a gray level corresponding to a red color included in a first gray level input to the first pixel 21. Similarly, the display element 21G and the display element 21B cast green light G1 and blue light B1, respectively, to the display surface side.

The second pixel 22 includes the display elements 22R, 22G, and 22B. The display element 22R includes a light source and emits red light R2 to the display surface side; the red light R2 has a luminance according to a gray level corresponding to a red color included in a second gray level input to the second pixel 22. Similarly, the display element 22G and the display element 22B emit green light G2 and blue light B2, respectively, to the display surface side.

[Third Mode]

FIG. 3A illustrates an example of an operation mode in which the display elements 21R, 21G, and 21B that reflect external light and the display elements 22R, 22G, and 22B that emit light are driven together to display an image. As illustrated in FIG. 3A, the pixel unit 20 can mix the reflected light R1, G1, and B1 and the emitted light R2, G2, and B2, that is, mix light of six colors, to generate light 25 of a predetermined color that is casted to the display surface side.

[First Mode]

FIG. 3B illustrates an example of an operation mode in which the display elements 21R, 21G, and 21B that reflect external light are driven to display an image. As illustrated in FIG. 3B, the pixel unit 20 does not drive the second pixel 22 and mixes only light (the light R1, the light G1, and the light B1) from the first pixel 21 to generate the light 25 of a predetermined color that is casted to the display surface side, in the case where, for example, the illuminance of external light is sufficiently high. Thus, driving with extremely low power consumption can be performed.

[Second Mode]

FIG. 3C illustrates an example of an operation mode in which the display elements 22R, 22G, and 22B are driven to display an image. As illustrated in FIG. 3C, the pixel unit 20 does not drive the first pixel 21 and mixes only light (the light R2, the light G2, and the light B2) from the second pixel 22 to generate the light 25 of a predetermined color that is emitted to the display surface side, in the case where, for example, the illuminance of external light is extremely low. Accordingly, a clear image can be displayed. Furthermore, the luminance is lowered when the illuminance of external light is low, which can prevent a user from feeling dazzle and reduce power consumption.

Each of the first mode, the second mode, and the third mode can partly be performed in the display region of the display portion 121 and 122. That is, different portions in the display region may employ different display modes.

The above is the description of the structure example of the pixel unit 20.

[Block Diagram 2]

Figure 4:
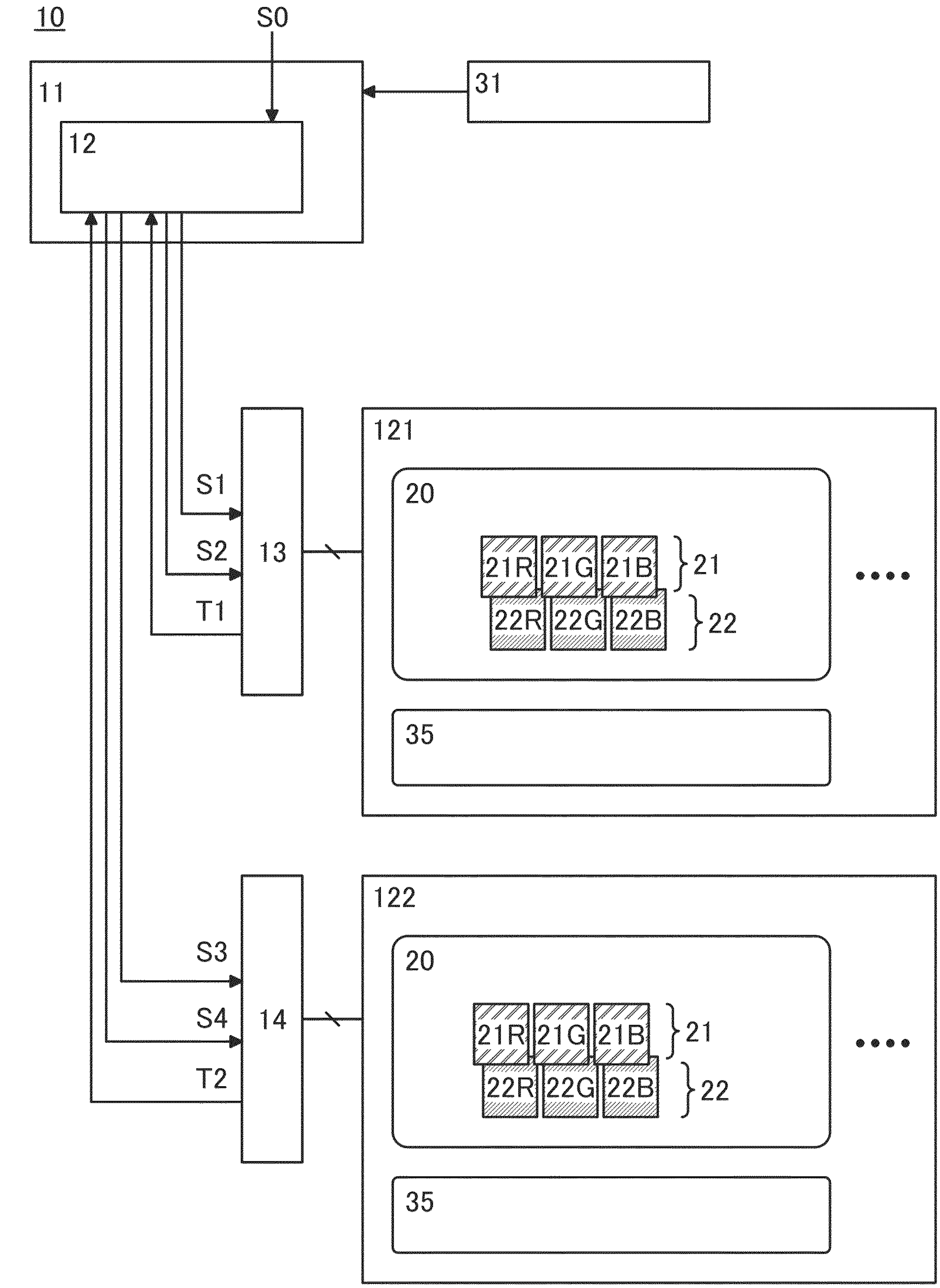
FIG. 4 shows a structure example of an electronic device.

FIG. 4 illustrates a structure example that is partly different from that in FIG. 2. The electronic device 10 in FIG. 4 includes a viewpoint detection portion 31. Each of the display portions 121 and 122 includes a touch sensor 35. Thus, the display portions 121 and 122 each can be regarded as a touch panel or a touch panel module.

Each of the driver portions 13 and 14 in FIG. 4 has a function of driving the touch sensor 35 and a function of outputting a signal T1 or T2 including positional data obtained by the touch sensor 35 to the control portion 11.

The touch sensor 35 can be, for example, a touch sensor of a capacitive type, a resistive type, a surface acoustic wave type, an infrared type, an electromagnetic induction type, an optical type, or a pressure-sensitive type. Gestures such as touch, tap, swipe, and pinch-in/out on the display portions 121 and 122 can be detected as input operations (also referred to as user inputs), for example.

The viewpoint detection portion 31 has a function of detecting a viewpoint of a user and outputting the positional data of the viewpoint to the control portion 11.

For example, the viewpoint detection portion 31 includes the following components: an image-capture device that captures an image of user's eye, and an arithmetic device that calculates the positional data of the point at which the user looks fixedly on the basis of the image data obtained by the image-capture device and outputs the data to the control portion 11. The viewpoint detection portion 31 includes, for example, a fixed-focus or variable-focus optical device (such as a lens) or an image sensor or the like that can detect light such as visible light, infrared light, or ultraviolet light two-dimensionally.

When a captured image includes user's eye, the viewpoint detection portion 31 calculates the direction and position of the pupil of the user, the distance from the viewpoint detection portion 31 to the eye, and the like, whereby the positional data of the point at which the user looks fixedly can be obtained.

It is preferable that the viewpoint detection portion 31 include two or more image-capture devices that are apart from each other. For example, images of user's right and left eyes are separately captured by two image-capture devices, so that the positional data of user's viewpoint can be calculated more accurately. Moreover, the viewpoint detection portion 31 may include a sensor that specializes in measuring the distance between the viewpoint detection portion 31 and user's eye (or face), such as an infrared sensor.

[Example 1 of Image Display Method]

An example of a method for displaying an image on the electronic device 10 will be described below.

Figure 5:
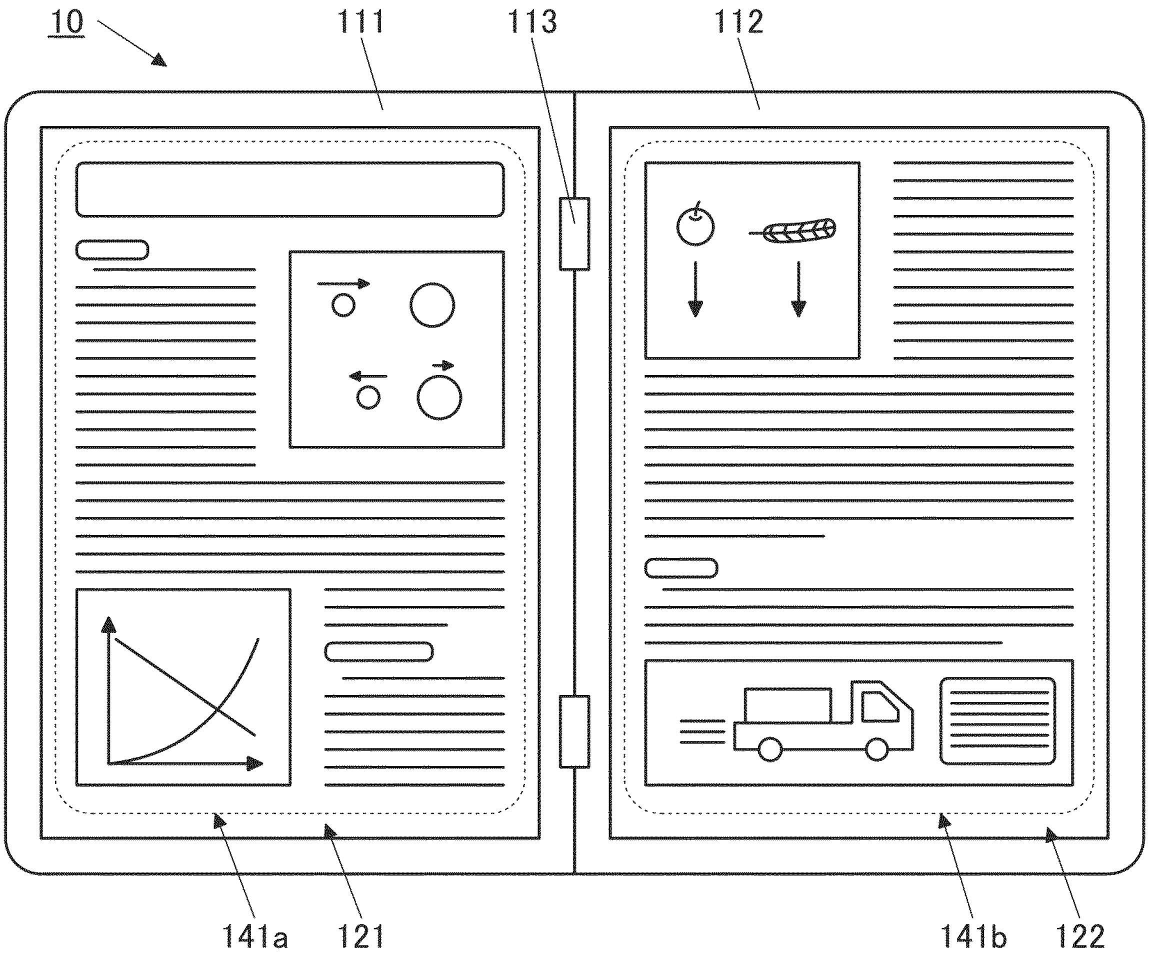
FIG. 5 illustrates an example of an image display method.

FIG. 5 is a schematic top view of the electronic device 10 that is opened.

[Textbook Mode]

FIG. 5 shows a state where the display portion 121 displays document data 141*a* and the display portion 122 displays document data 141*b* (such a state is referred to as a textbook mode). That is, FIG. 5 shows, for example, a state where an application for viewing document data is executed and a file containing the document data is read out and displayed.

In this example, the document data 141*a* and 141*b* are two certain facing pages of an educational text document. Thus, the electronic device 10 can be used as a textbook.

When the electronic device 10 is used as a textbook, the display portions 121 and 122 display still images for a very long time in the textbook mode. In addition, a user looks at the display portions 121 and 122 fixedly for a long time. Therefore, a display method with a reflective display element (the first mode) is employed to display document data on the display portions 121 and 122, thereby reducing power consumption and performing eye-friendly display. Furthermore, a screen rewriting frequency (also referred to as a frame frequency) is reduced when a still image is displayed, whereby power consumption can be reduced more effectively.

When the document data 141*a* and 141*b* include both text data and drawing data, the text data is displayed in the first mode and the drawing data is displayed in the second or third mode, for example. This enables emphasized display of the drawing data. Such emphasized display is particularly effective when the drawing data includes video contents. In addition, it is preferable that only the area displaying the text data be driven at a reduced screen rewriting frequency (frame frequency), in which case the power consumption can be reduced more effectively.

[Notebook Mode]

Figure 6A:
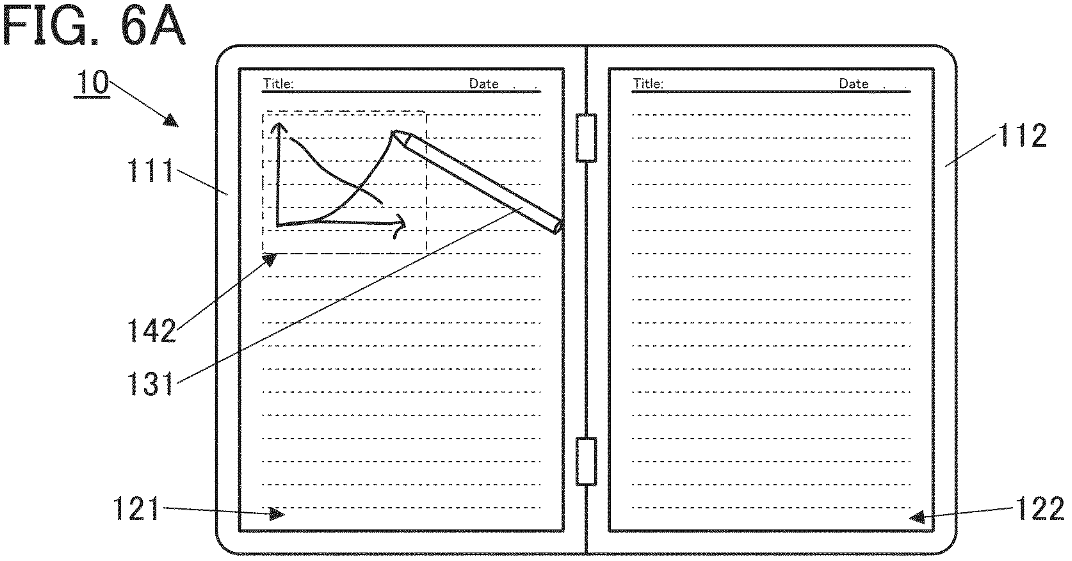
FIGS. 6A to 6C illustrate an example of an image display method.

FIG. 6A shows a state where a user can freely write on the display portions 121 and 122 (such a state is referred to as a notebook mode). A user can freely write or draw with a stylus 131, a finger, or the like, on the display portions 121 and 122 with displayed ruled lines in FIG. 6A. In FIG. 6A, a user input image 142 is displayed on the display portion 121.

For example, when the touch sensor 35 in the display portion 121 or 122 detects a user input by the stylus 131, a finger, or the like in the notebook mode, the control portion 11 generates the user input image 142 based on the input data and makes the display portion 121 or 122 display the image.

In the notebook mode, text input with the use of a software keyboard or the like is available as well as handwriting input. Furthermore, a drawing tool for drawing polygons, circles, straight lines, and the like is available to draw an image.

In the notebook mode, the ruled lines prepared in advance are displayed in the first mode while the user input image 142 is displayed in the second or third mode, for example. This can reduce power consumption and effectively emphasize only the data written by a user.

[Dual Mode]

Figure 6B:
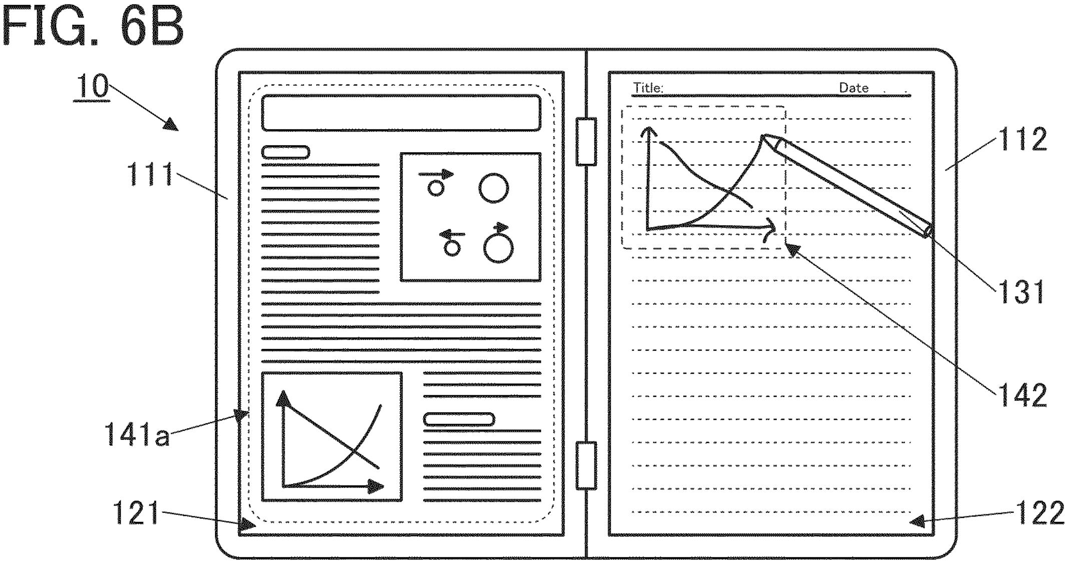

FIG. 6B shows a state where the display portion 121 displays the document data 141*a* while the display portion 122 is used as a notebook (such a state is referred to as a dual mode).

In the dual mode, a user can freely write on the display portion 122 while the document data 141*a* is displayed on the display portion 121. This mode allows the electronic device 10 to have two functions as a textbook and a notebook at a time, further increasing learning effectiveness.

[Writing Mode]

Figure 6C:
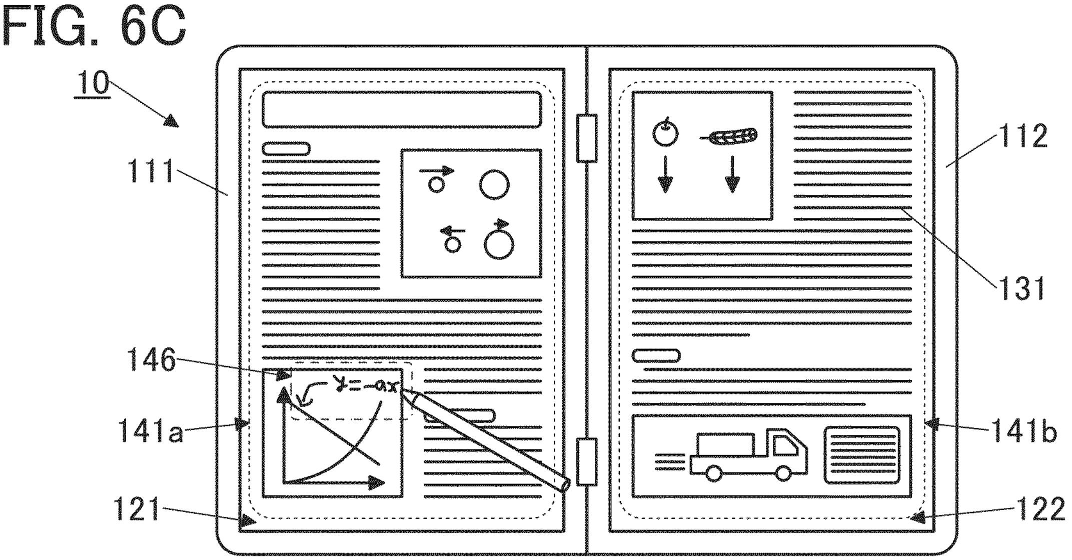

FIG. 6C shows a state where the display portions 121 and 122 display the document data 141*a* and 141*b*, respectively, as in the textbook mode shown in FIG. 5. In the mode of FIG. 6C, a user input image 146 written by a user can be superimposed on the document data 141*a* or 141*b* (such a mode is referred to as a writing mode).

In the writing mode, a user can draw a marker to highlight part of text data in the document data 141*a* and 141*b*.

The user input image 146 written by a user in the writing mode is preferably displayed in the second or third mode. This enables the user input image 146 to be emphasized even when it is superimposed on the document data 141*a* or 141*b*, and allows a user to intuitively distinguish the user input image from the document data.

Note that a user can freely switch the above-mentioned textbook mode, notebook mode, dual mode, and writing mode.

An example of a mode switching method is as follows. A horizontal swipe on the display portion 121 or 122 triggers page turning, and a vertical swipe on the display portion 121 or 122 triggers switching between the textbook mode and the notebook mode of the display portion. Switching to the writing mode or selection of a drawing tool is performed by a tap on an icon associated with such an operation displayed on part of the display portion 121 or 122.

[Submission Mode]

Figure 7:
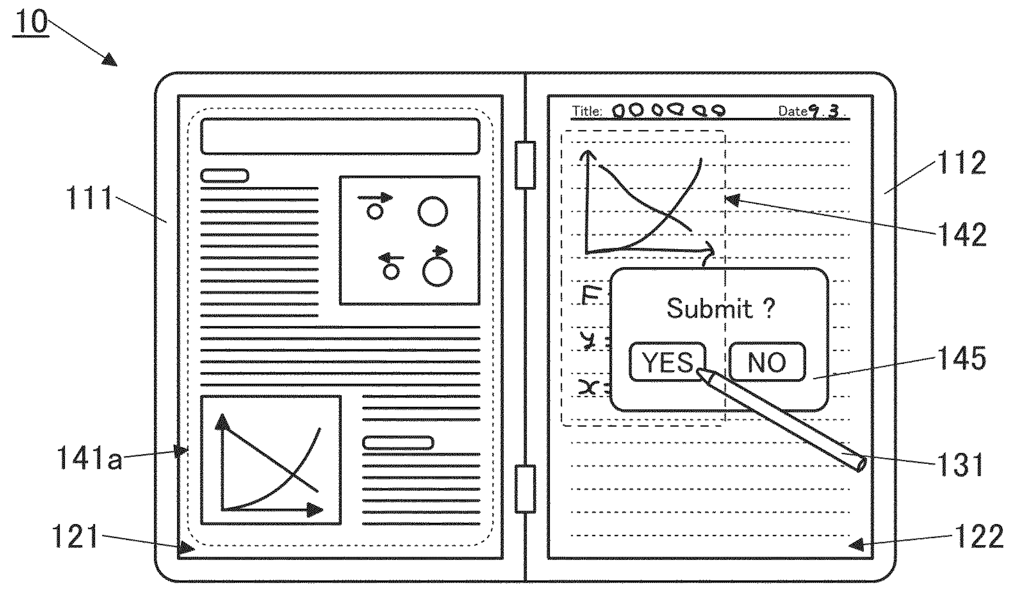
FIG. 7 illustrates an example of an image display method.

FIG. 7 shows a state where the user input image 142 made by a user is to be sent to a submission destination (such a state is referred to as a submission state). For example, an icon associated with a submission operation is displayed in the notebook mode or the dual mode, and a tap on the icon pops up a window 145 for determining whether submission is performed, as shown in FIG. 7.

Information on the user input image 142 is converted into data and the data can be sent to a server of an institution such as a school or a company via wireless communication or the like. The data to be sent preferably includes identification data (ID) to identify the electronic device 10 and the user, data of time and date, and the like, in addition to the data of the user input image 142. Furthermore, the data to be sent is more preferably encrypted.

This allows a user to submit the user input image 142 easily without start-up of an application such as mailer. This also gives an advantage to the recipient (an institution such as a school or a company) of the user input image 142 in easy data management, because the recipient does not need to deal with attached documents that are separately sent by e-mails or the like.

The above is the description of the example 1 of the image display method.

[Example 2 of Image Display Method]

An example of an image display method capable of a further reduction in power consumption will be described below.

Figure 8A:
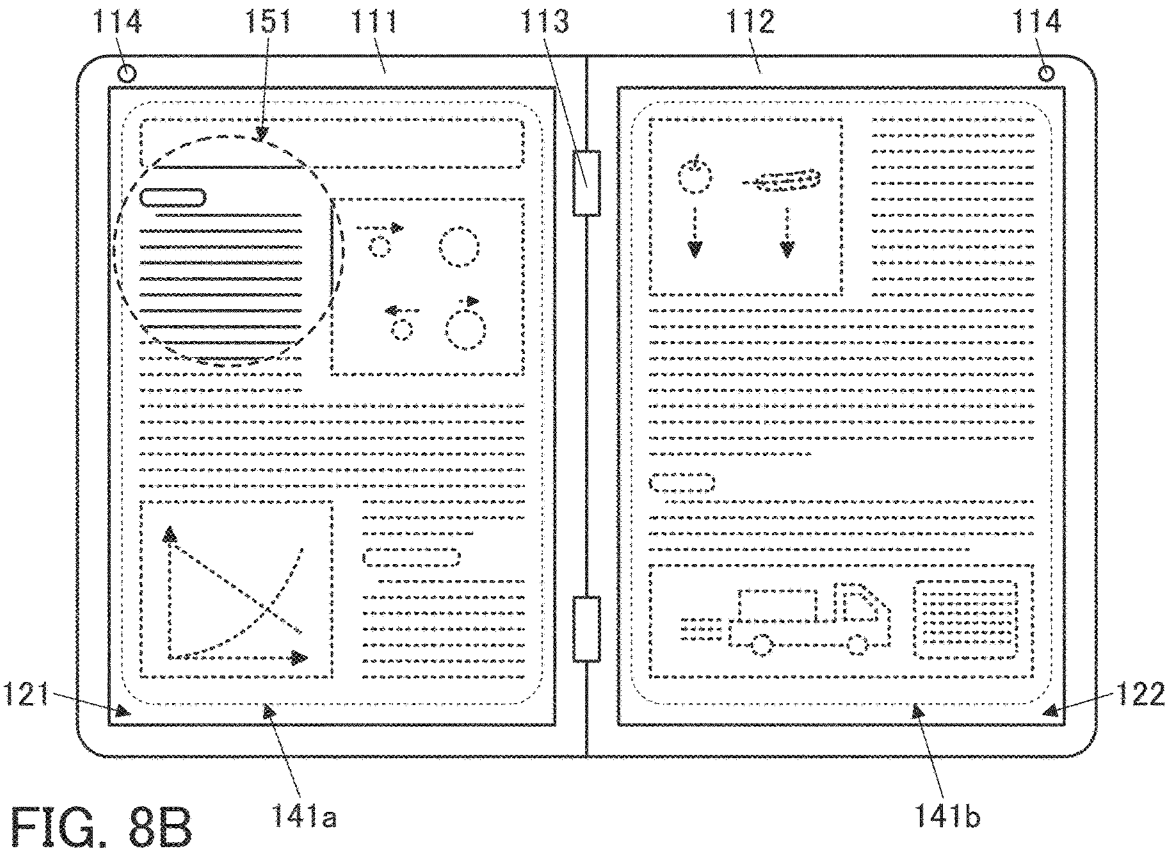
FIGS. 8A and 8B illustrate an example of an image display method.

FIG. 8A illustrates a state where the document data 141*a* and 141*b* shown in FIG. 5 are displayed. Here, a region 151 in the display portion 121 is an area at which a user looks fixedly or a region including the area and the neighborhood thereof.

Figure 8B:
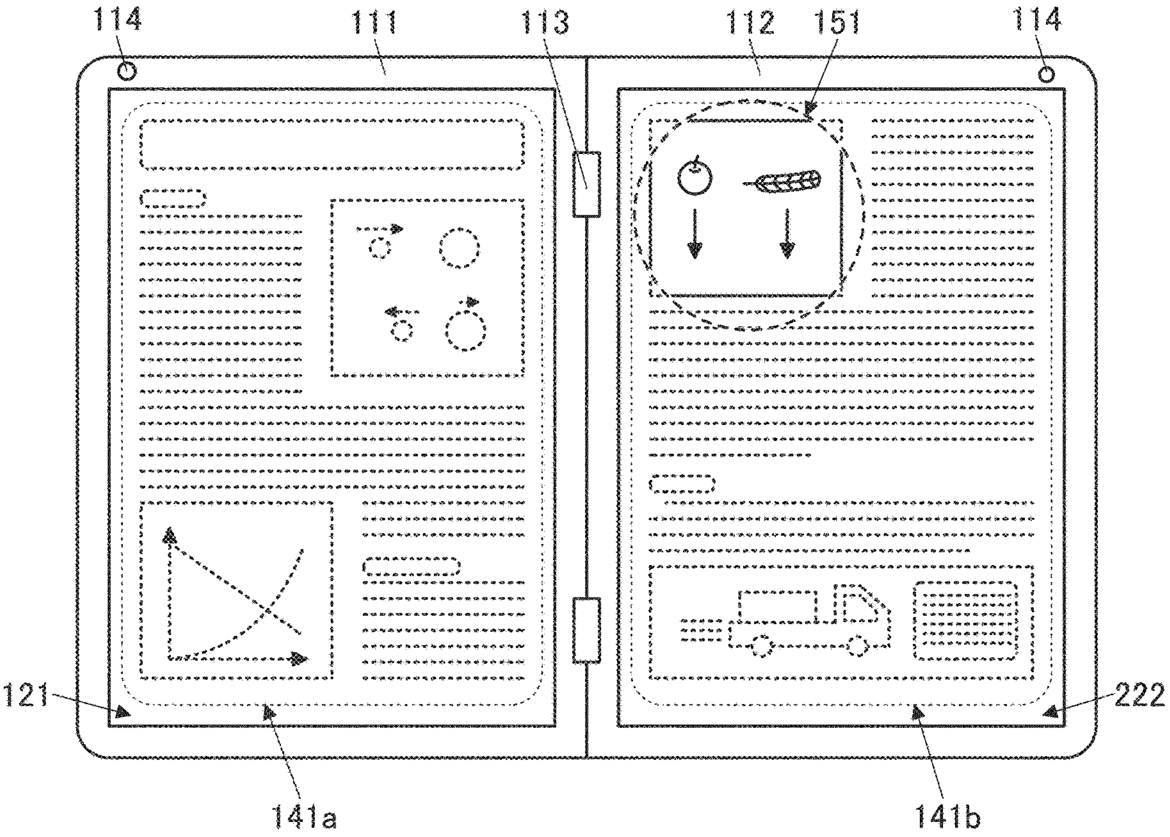

FIG. 8B shows an example where the region 151 including an area at which a user looks fixedly is moved into the display portion 122.

Each of the housings 111 and 112 has a camera 114 on the display surface side. The pair of cameras 114 serves as part of the above-mentioned viewpoint detection portion 31.

An image in the region 151 including the area at which a user looks fixedly is preferably displayed in the second or third mode. In contrast, an image in a portion at which a user does not look fixedly, i.e., the display portion 122 and a portion other than the region 151 in the display portion 121, is preferably displayed in the first mode. This allows most part of the display portions 121 and 122 to perform display only with reflective display elements, leading to an effective reduction in power consumption.

When an area outside the region 151 includes a video content, the content is preferably displayed as a still image instead of a moving image. That is, all images in the area outside the region 151 are preferably displayed as still images. Here, the area outside the region 151 displays images at a reduced frame frequency, whereby the power consumption can be reduced more effectively.

When the region 151 is moved to a portion where a video content is displayed as shown in FIG. 8B, that is, when a user watches the video content, the state of the portion is preferably switched from still image display to moving image display to make the video content playable. Here, the video content may start to play automatically at a time when the region 151 overlaps with the portion of the video content, or may be in a standby state and start to play by an operation such as a tap by a user.

The above is the description of the example 2 of the image display method.

[Housing]

When the electronic device 10 is used as a textbook, the housings 111 and 112 are preferably light in weight. For example, the weight of each of the housings 111 and 112 is greater than or equal to 10 g and less than or equal to 1000 g, preferably greater than or equal to 50 g and less than or equal to 800 g, further preferably greater than or equal to 50 g and less than or equal to 500 g, still further preferably greater than or equal to 50 g and less than or equal to 250 g. When the total weight of the two housings is 500 g or less, the weight of the electronic device is equivalent to or less than the weight of a specialized book, and thus is particularly preferable as a device that a child brings on a daily basis.

Furthermore, the electronic device 10 used as a textbook or the like should have a service life of several years. Thus, the housings 111 and 112 preferably contain a material with high weather resistance or strength. For example, an alloy such as a titanium alloy, a magnesium alloy, or an aluminum alloy, a carbon fiber, or the like is preferably used.

The housings 111 and 112 have not angular but rounded end portions as shown in the drawings such as FIGS. 1A to 1C and FIG. 5, whereby the electronic device 10 is fairly safe even when used by a child.

The above is the description of the housing.

Example 3 of Image Display Method

An example of an image display method of the electronic device that is different from the above will be described below.

Figure 9A:
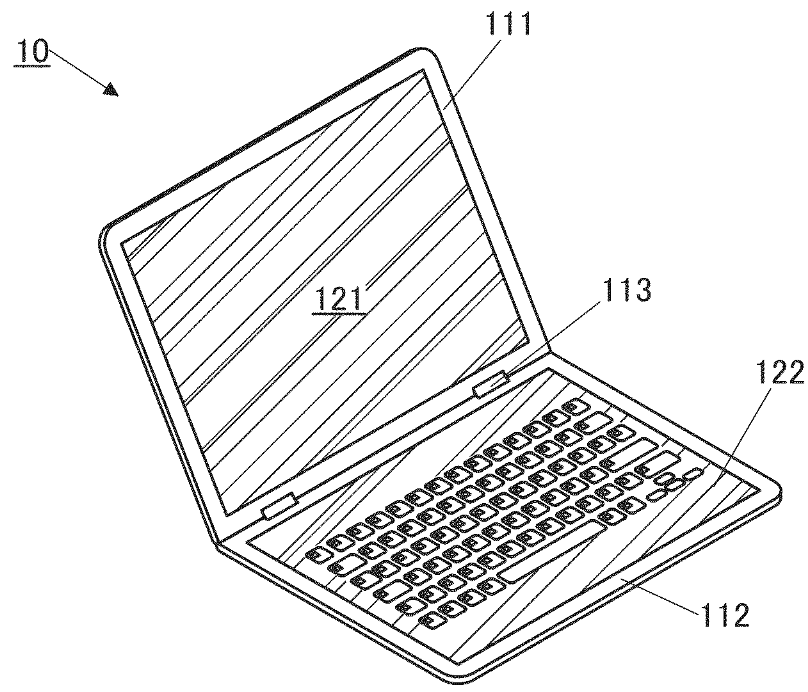
FIGS. 9A and 9B show a structure example of an electronic device.
Figure 9B:
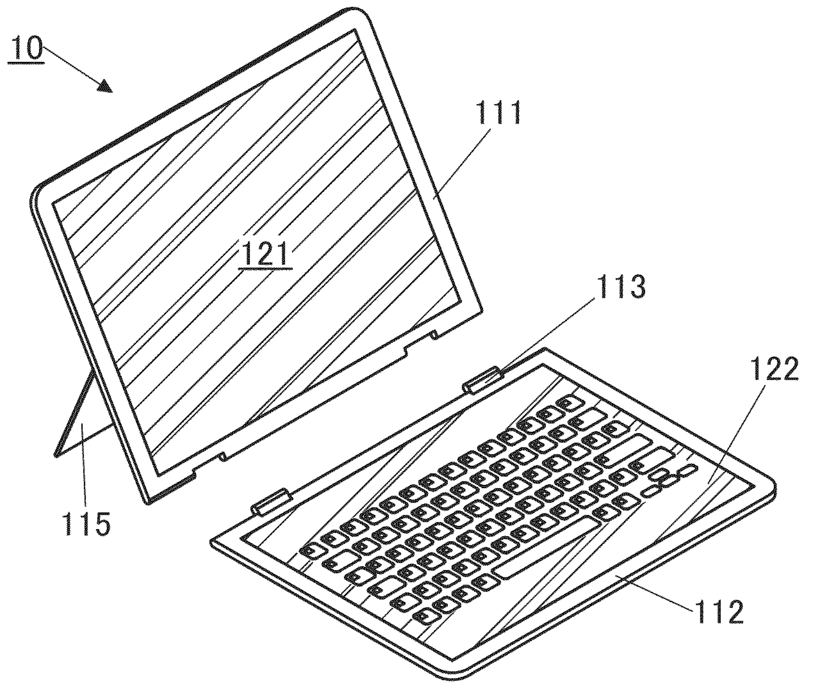

FIG. 9A is a perspective view of the electronic device 10. In the example of FIGS. 9A and 9B, the display portion 122 is used as an input device (such as a keyboard). The electronic device 10 with such a structure can be used as a laptop computer, for example.

FIG. 9B shows that the housing 111 is separated from the housing 112. In FIG. 9B, the housing 111 has a support portion 115 on its backside (a surface at the side opposite to the display portion 121), and is held in a state of being inclined by the support portion 115. The support portion 115 is preferably stored in the housing 111 when not in use. When one of the display portions that is used as a screen can be separated from the other that is used as an input device as described here, the electronic device 10 can be further convenient.

When the housings 111 and 112 are separated from each other, the housing 111 can serve as a portable information terminal such as a tablet terminal while the housing 112 can serve as an input device capable of wireless communication with the housing 111. Here, when the control portion and the like are integrated in the housing 111, the internal structure of the housing 112 can be simplified and thus the electronic device 10 can be light in weight. Alternatively, the housings 111 and 112 may serve as independent portable information terminals.

Although the separation can be performed between the hinges 113 and the housing 111 in the example of FIG. 9B, the structure is not limited to the example. For example, the hinge 113 may have a mechanism by which the hinge 113 can be separated into two parts. Alternatively, the housings 111 and 112 may have a mechanism by which they can be detachably joined together without the hinge 113.

FIG. 10A is a schematic top view of the housing 112. Part of the display portion 122 displays an image 143 including a plurality of objects 143*a* each representing a key on a keyboard. Each of the plurality of objects 143*a* is associated with an input operation. When a user taps any of the objects by a finger 132 or the like as shown in FIG. 10A, the data input by the user is sent to the control portion 11.

FIG. 10B1 shows that the finger 132 taps one of the objects 143*a*. In FIG. 10B2, the finger 132 is shown by a dotted line.

Here, the object touched by the finger 132 or the like is mostly hidden by the finger 132 or the like, and thus not viewed by the user. Therefore, it is preferable that the object touched by the finger 132 or the like be displayed in the first mode only with reflective display elements, or stop its display. This reduces power consumption. In contrast, objects that are not touched by the finger 132 or the like can be displayed in the second or third mode with light-emitting elements. In an environment with sufficiently bright light or on a request by a user, a portion that is not touched by the finger 132 or the like may also be displayed in the first mode.

As well as the object touched by the finger 132, an object covered by the finger 132 is not viewed by the user as shown in FIG. 10B 3; thus, such an object may be displayed in the first mode. In that case, the display portion 122 includes a touch sensor such as a proximity sensor or an optical sensor to obtain the positional data of the finger 132 or the like within a predetermined distance from the surface of the display portion 122.

FIG. 10C1 shows an enlarged view of two objects as an example. The two objects in FIG. 10C1 correspond to characters of “E” and “R”.

As shown in FIG. 10C1, it is preferable that only outline portions 144*a* and character portions 144*b* of the keys be displayed and the other portion not be displayed. In particular, in the second or third mode with light-emitting elements, light-emitting elements positioned in a portion other than the outline portions 144*a* and the character portions 144*b* are in black display (that is, they do not emit light), whereby power consumption can be minimized.

FIG. 10C2 shows a state where the finger 132 taps the key “R”. Here, the key “E” is displayed in the second or third mode with light-emitting elements while the key “R” is displayed in the first mode only with reflective display elements. Most part of the key “R” is covered by the finger 132 and does not receive external light, and thus is not displayed practically.

The above is the description of the example 3 of the image display method.

One embodiment of the present invention includes two display portions, and the two display portions can individually display the first image displayed with reflected light, the second image displayed with emitted light, and the third image displayed with light including both reflected light and emitted light. One display portion can display two or more of the first to third images at a time. Accordingly, various image display methods can be employed. Furthermore, increasing an area displaying the first image as much as possible leads to a decrease in power consumption. In contrast, the second image or the third image is used for a portion that is desirably emphasized, whereby a user can enjoy the display with less frustration with reduced power consumption.

In combination with an input unit such as a touch sensor and a unit for recognizing user’s viewpoint, power consumption for display in an area where a user does not see can be reduced; thus, the image display method offering less frustration and less power consumption can be achieved more effectively.

At least part of this embodiment can be implemented in combination with any of the other embodiments and the other examples described in this specification as appropriate.

Embodiment 2

This embodiment will describe an image display method that can reduce power consumption and the like. Specifically, in the image display method described here, an image with a small change is distinguished from an image with a large change and displayed in a display method with small power consumption.

The method described in this embodiment as an example can be applied to a display technique called augmented reality (AR) that displays an image obtained by combining an image captured by an image-capturing unit and an image such as computer graphics (CG) generated by software.

A display device used for a display system of one embodiment of the present invention includes the first pixel with the first display element and the second pixel with the second display element. At least the first pixel can retain written data for two or more successive frame periods and maintain the display without data rewriting.

Thus, an image with a small change is displayed with the first pixel while an image with a large change is displayed with the second pixel, whereby power consumption can be reduced.

[Structure Example]

Figure 11:
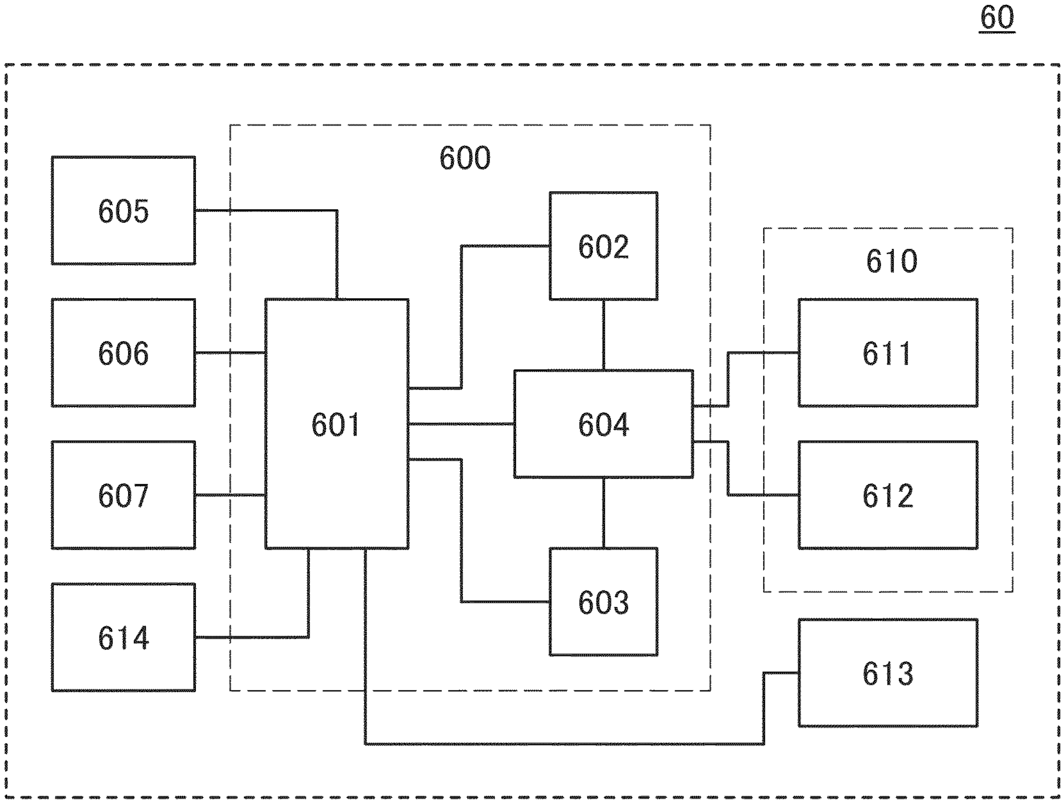
FIG. 11 is a block diagram illustrating a display system.

FIG. 11 is a block diagram for describing a display system of one embodiment of the present invention. A display system 60 shown in FIG. 11 includes a control portion 600, a display portion 610, a camera 605 (CAM), a global positioning system (GPS) receiver 606 (GPS), a data input-output portion 607 (I/O), a touch sensor 613 (T-SEN), and a photosensor 614 (P-SEN). Components included in the display system 60 are not limited thereto, and other components may be included.

The display system 60 in FIG. 11 can be used for the electronic device 10 in Embodiment 1. The display system 60 described here can be incorporated in the housing 111 or 112, or in both of them in Embodiment 1. The display system 60 incorporated in one of the housings can control both of the display portions 121 and 122. Thus, the display portion 610 described below corresponds to the display portion 121 or 122 or to both of them in Embodiment 1.

The control portion 600 includes a data processing circuit 601 (CPU), a first memory 602 (RAM1), a second memory 603 (RAM2), and a control circuit 604 (CON).

For the data processing circuit 601, an arithmetic circuit such as a central processing unit (CPU) can be used. The data processing circuit 601 has a function of controlling the display system 60 as a whole by, for example, receiving/transmitting signals as necessary from/to the first memory 602, the second memory 603, the control circuit 604, the camera 605, the GPS receiver 606, the data input-output portion 607, the touch sensor 613, the photosensor 614, and the like.

The first memory 602 and the second memory 603 each have a function of storing image data. For example, each of them retains image data as a frame memory and enables data reception/transmission between the data processing circuit 601 and the control circuit 604. In addition, each of them retains a plurality of frame data and enables processing such as image data comparison between frames.

The first memory 602 has a function of storing image data that is displayed with the first display element.

The second memory 603 has a function of storing image data that is displayed with the second display element.

The control circuit 604 has a function of controlling an operation by the display portion 610 in accordance with update frequencies of the two kinds of image data.

The display portion 610 includes a first pixel 611 (PIX 1) with the first display element and a second pixel 612 (PIX 2) with the second display element. The first display element is a reflective liquid crystal element, for example. The second display element is a light-emitting element, for example.

A reflective liquid crystal element can operate with low power consumption and a light-emitting element can perform display with high visibility. Note that the first pixel 611 and the second pixel 612 may have the second display element and the first display element, respectively.

Each of the first pixel 611 and the second pixel 612 preferably has a transistor whose channel region includes a metal oxide as a transistor for image data writing. Such a preferred transistor has an extremely low off-state current and enables long-time retention of a potential written as image data. Thus, image display can be maintained for a plurality of frame periods without rewriting of image data; that is, so-called idling stop driving is available.

The idling stop driving enables retention of image data written in a pixel for two or more frames. This reduces the frequency of image data rewriting and thus lowers power consumption.

A reflective liquid crystal element that can be used as the first display element does not need a backlight, and accordingly the power consumption in the pixel portion is equivalent to the power consumption by circuit operations. Thus, a pixel with the first display element is particularly preferable to be subjected to the idling stop driving. In that case, the power consumption in the pixel portion can decrease in proportion to the rewriting frequency.

The camera 605 has a function of capturing an image according to incident light.

The GPS receiver 606 can communicate with a communication satellite, and has a function of calculating a receiving position.

The data input-output portion 607 has a function of obtaining/outputting image data or the like from/to the outside. For example, the data input-output portion 607 can be connected to a wired or wireless network, and can obtain image data or the like from the outside through the network. Furthermore, the data input-output portion 607 may be connected to a data medium that stores image data or the like.

The touch sensor 613 is an input unit and overlaps with the display portion 610. The touch sensor 613 has a function of converting a touch operation by a user on the display portion 610 into an electrical signal and outputting the signal to the data processing circuit 601. The input data that is output to the data processing circuit 601 is used as an input signal for application software processed by the data processing circuit 601.

The photosensor 614 has a function of measuring the illuminance of an environment where the display system 60 is used. The data processing circuit 601 and the control circuit 604 obtains data of the illuminance and performs processing such as determination of a display element to be used, change in the luminance of the display portion 610, or color adjustment of an image. Note that the photosensor 614 may be provided in a pixel. The display system 60 of one embodiment of the present invention can omit the touch sensor 613 and the photosensor 614.

The use of the display system 60 including the above-described components enables image synthesis with a plurality of images, and allows display of the synthesized image. For example, an image of an object captured by the camera 605 and the data of the object obtained from the data input-output portion 607 can be combined and displayed in the display portion 610.

When an image P captured by the camera 605 is displayed with one of the first pixel 611 and the second pixel 612 while an image Q obtained through the data input-output portion 607 is displayed with the other, display of the image P partly overlaps with that of the image Q. Thus, a region of the image P overlapping with the image Q is preferably processed to be a black image. Such processing is performed by the data processing circuit. The processing is unnecessary depending on usage.

A synthesis position of the image Q relative to the image P can be determined with the use of a designated marker in the first image. Alternatively, the position can be determined from, for example, a result of calculation based on positional data obtained by the GPS receiver 606, one of data obtained through the data input-output portion 607 and image capturing data of the camera 605, or combined data thereof.

The control circuit 604 has a function of making the first pixel 611 display image data that is input from the first memory 602. The first pixel 611 includes a reflective liquid crystal element and is capable of the above-mentioned idling stop driving. Thus, when image data is displayed at a low rewriting frequency by the first pixel 611, an operation by a peripheral circuit for driving the first pixel 611 can be suspended for certain frame periods.

In addition, the control circuit 604 has a function of making the second pixel 612 display image data that is input from the second memory 603. The second pixel 612 includes a light-emitting element, and has a favorable display response to moving-image display. Thus, the second pixel 612 preferably displays an image that requires a higher rewriting frequency than the image displayed by the first pixel 611.

The number of frames for the idling stop driving may be a predetermined number, or may be changed automatically in accordance with a change in environment recognized by any of a variety of sensors (having a function of measuring power, displacement, position, speed, acceleration, angular velocity, the number of rotations, distance, light, magnetism, temperature, a chemical substance, sound, time, hardness, an electric field, current, voltage, electric power, radiation, a flow rate, humidity, gradient, oscillation, smell, infrared ray, or the like). Such control can improve the consistency with reality, and can reduce unnecessary rewriting of image data to lower power consumption.

[Idling Stop Driving]

An example of the above-mentioned idling stop driving will be described with reference to FIGS. 12A to 12C.

Figure 12A:
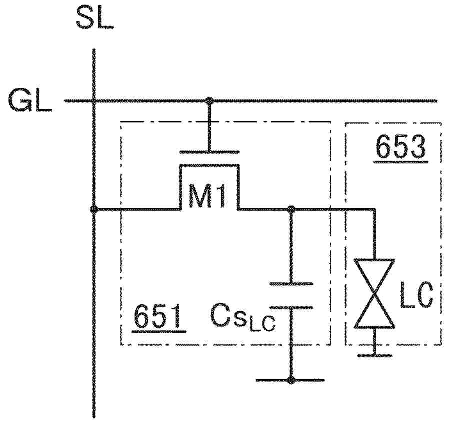
FIGS. 12A to 12C illustrates idling stop driving.

FIG. 12A is a circuit diagram of a pixel including a liquid crystal element 653 and a pixel circuit 651. FIG. 12A illustrates a transistor M1 connected to a signal line SL and a gate line GL, a capacitor $Cs_{LC}$, and a liquid crystal element LC.

Figure 12B:
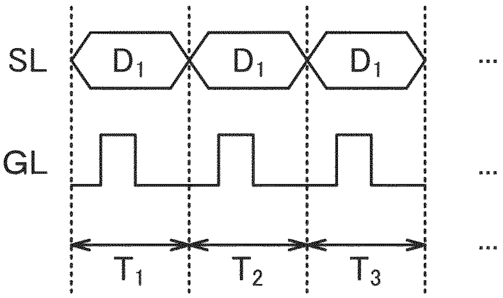

FIG. 12B is a timing chart showing waveforms of signals supplied to the signal line SL and the gate line GL in a normal driving mode that does not perform the idling stop driving. In the normal driving mode, a normal frame frequency (e.g., 60 Hz) can be used for operation.

The frame frequency includes successive frame periods $T_1$, $T_2$, and $T_3$. In each of the frame periods, a scan signal is supplied to the gate line and data $D_1$ of the signal line is written to the pixel. This operation is performed both to write the same data $D_1$ in the periods $T_1$ to $T_3$ and to write different data in the periods $T_1$ to $T_3$.

Figure 12C:
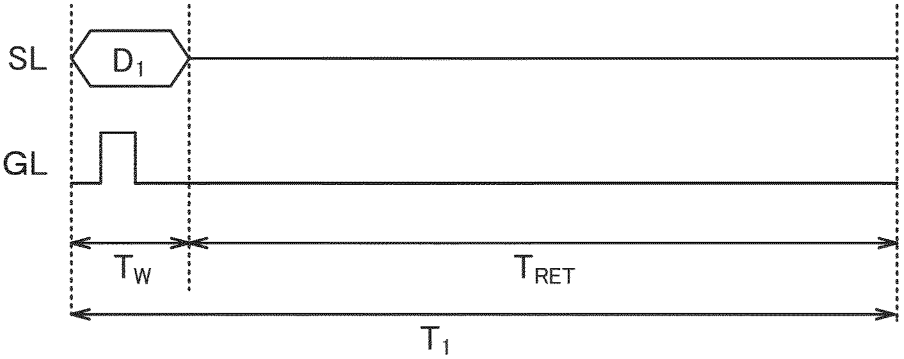

FIG. 12C is a timing chart showing waveforms of signals supplied to the signal line SL and the gate line GL in the idling stop driving. In the idling stop driving, a low frame frequency (e.g., 1 Hz) can be used for operation.

FIG. 12C shows a frame period $T_1$ in the frame frequency, which includes a period $T_W$ for writing data and a period $T_{RET}$ for retaining data. The idling stop driving is performed as follows: in the period $T_W$, a scan signal is supplied to the gate line and the data $D_1$ of the signal line is written to the pixel; in the period $T_{RET}$, the gate line is fixed to a low-level voltage so that the transistor M1 is off and the written data $D_1$ is retained in the pixel.

The use of a transistor including a metal oxide as the transistor M1 enables retention of the data $D_1$ for a long time, owing to its low off-state current. Although FIGS. 12A to 12C show the example where the liquid crystal element LC is used, the idling stop driving is available even when a light-emitting element such as an organic EL element is used.

In the circuit diagram illustrated in FIG. 12A, the liquid crystal element LC might serve as a leakage path of data $D_1$. Therefore, to perform the idling stop driving appropriately, the resistivity of the liquid crystal element LC is preferably higher than or equal to $1.0\times10^{14}$ Ω·cm.

[Example of Display Method]

Next, a specific display example will be described. An example described here achieves highly efficient idling stop driving with a structure where the first display element is provided in the first pixel 611 and the second display element is provided in the second pixel 612, which is explained with reference to FIGS. 13A1 to 13A3 and FIG. 14.

FIGS. 13A1 to 13A3 show an example of synthetic images where images of a flying object obtained as second images Q1, Q2, and Q3 (described later) are combined with images of a group of buildings obtained as a first image P1 (described later). Successive display of FIGS. 13A1 to 13A3 makes a moving image where the flying object that does not really exist flies over the group of buildings.

Figure 14:
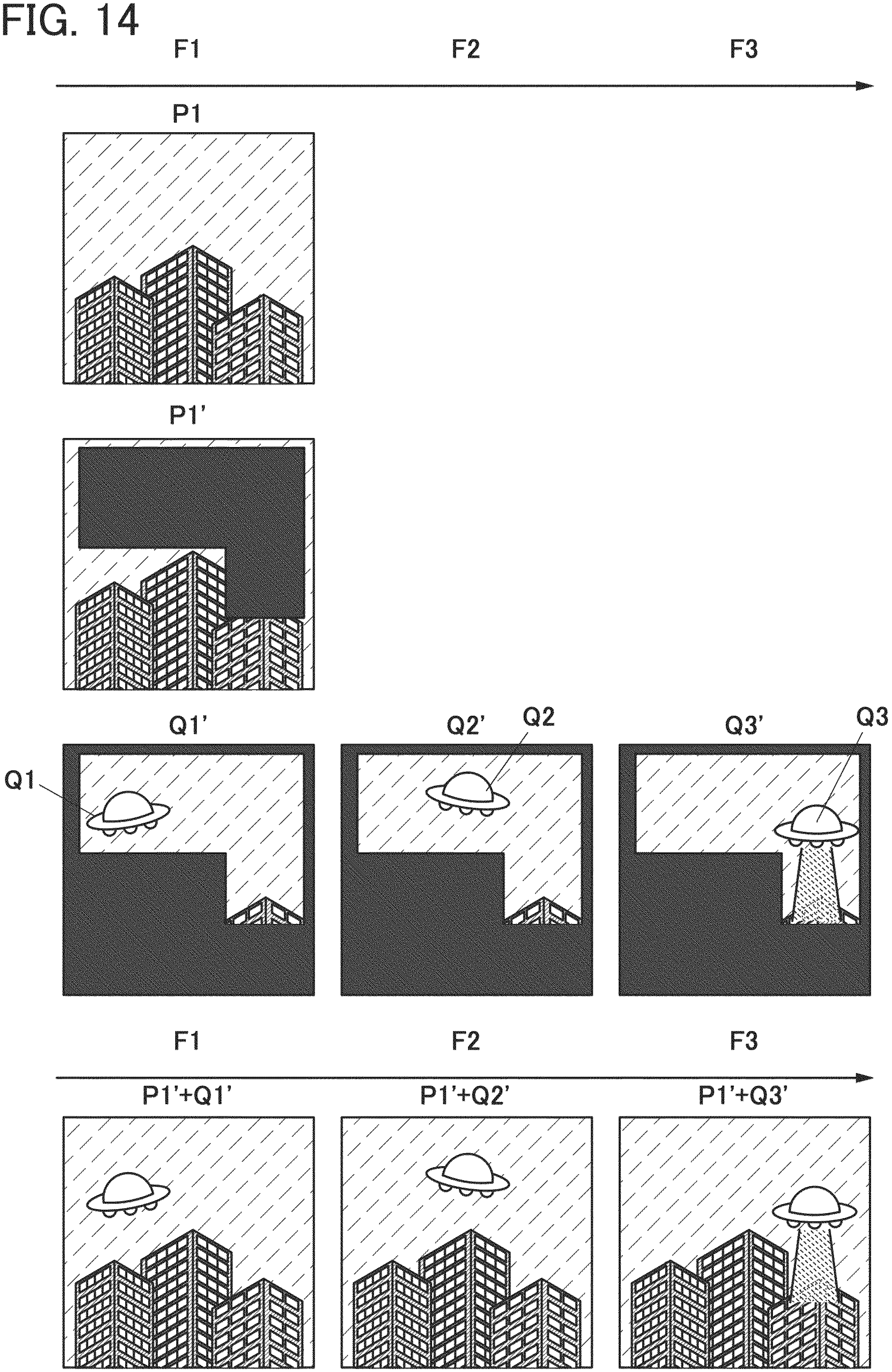
FIG. 14 illustrates a specific display example.

FIG. 14 shows a specific example of images that are obtained, generated, or displayed in periods F1 to F3 to make the images in FIGS. 13A1 to 13A3.

In the period F1, an image of the group of buildings is captured by the camera 605 as the first image P1. Then, the first image P1 is processed so that a region subjected to image synthesis is in black display; as a result, a third image P1' is generated.

In addition, an image of the flying object is obtained from the data input-output portion 607 as the second image Q1. Then, the second image Q1 and the original data of the region in black display in the third image P1' are combined and the remaining region is processed to be in black display; as a result, a fourth image Q1' is generated.

Subsequently, the third image P1' is displayed by the first pixel 611 and the fourth image Q1' is displayed by the second pixel 612, so that an image shown in FIG. 13A1 is displayed as a whole.

The display of the third image P1' by the first pixel 611 is maintained by the idling stop driving even in and after the period F2.

In the period F2, another image of the flying object is obtained from the data input-output portion 607 as the second image Q2, and the fourth image Q2' is generated. The fourth image Q2' is displayed by the second pixel 612, and the image shown in FIG. 13A 2 is displayed as a whole.

In the period F3, another image of the flying object is obtained from the data input-output portion 607 as the second image Q3, and the fourth image Q3' is generated. The fourth image Q3' is displayed by the second pixel 612, and the image shown in FIG. 13A3 is displayed as a whole.

In this way, a region to which an image is added is separated from the original image, whereby the idling stop driving can be performed efficiently in the remaining region of the original image.

The period F1 includes a period for obtaining the first image P1, a period for generating the third image P1', a period for obtaining the second image Q1, a period for generating the fourth image Q1', and a period for displaying the third image P1' and the fourth image Q1'. Here, during a period other than the period for displaying the third image P1' and the fourth image Q1', it is preferable to display an image synthesized and displayed before the period F1. Operations in the periods F2 and F3 are preferably carried out similarly; that is, during a period other than the period for displaying the fourth image Q2' or Q3' by the second pixel 612, it is preferable to display an image synthesized and displayed before that period.

The above is the description of the example of a display method.

[Semiconductor Device]

A semiconductor device such as a transistor used in the above-mentioned pixel or circuit for driving the pixel preferably includes a metal oxide in its semiconductor layer. As the metal oxide, for example, a cloud-aligned composite oxide semiconductor (CAC-OS) that is described later can be used.

In particular, an oxide semiconductor having a wider band gap than silicon is preferably used. When a semiconductor material having a wider band gap and a lower carrier density than silicon is used, the off-state current of the transistor can be reduced.

Its low off-state current enables retention of charges accumulated in a capacitor that is series-connected to the transistor for a long time. When such a transistor is used for a pixel, operation of a driver circuit can be stopped while a gray scale of each pixel is maintained. As a result, an electronic device with extremely low power consumption can be obtained.

A semiconductor device such as a transistor used in the above-mentioned pixel or circuit for driving the pixel may include a polycrystalline semiconductor. For example, polycrystalline silicon or the like is preferably used. Polycrystalline silicon can be formed at a lower temperature than single-crystal silicon and has higher field effect mobility and higher reliability than amorphous silicon. When such a polycrystalline semiconductor is used for a pixel, the aperture ratio of the pixel can be improved. Even when a very large number of pixels are provided, a gate driver circuit and a source driver circuit can be formed over a substrate where the pixels are formed, so that the number of components of an electronic device can be reduced.

At least part of this embodiment can be implemented in combination with any of the other embodiments and the other examples described in this specification as appropriate.

Embodiment 3

An example of a display panel that can be used for the display device of one embodiment of the present invention is described below. The display panel described below as an example includes both a reflective liquid crystal element and a light-emitting element and can display an image in both a light-emitting mode and a reflective mode.

[Structure Example]

FIG. 15A is a block diagram illustrating an example of the structure of a display device 400. The display device 400 includes a plurality of pixels 410 that are arranged in a matrix in a display portion 362. The display device 400 also includes a circuit GD and a circuit SD. In addition, the display device 400 includes a plurality of wirings G1, a plurality of wirings G2, a plurality of wirings ANO, and a plurality of wirings CSCOM, which are electrically connected to the circuit GD and the plurality of pixels 410 arranged in a direction R. Moreover, the display device 400 includes a plurality of wirings S1 and a plurality of wirings S2, which are electrically connected to the circuit SD and the plurality of pixels 410 arranged in a direction C.

Although the display device includes one circuit GD and one circuit SD here for simplification, the circuit GD and the circuit SD for driving a liquid crystal element and the circuit GD and the circuit SD for driving a light-emitting element may be provided separately.

The pixel 410 includes a reflective liquid crystal element and a light-emitting element. In the pixel 410, the liquid crystal element and the light emitting element partly overlap with each other.

FIG. 15B1 illustrates a structure example of a conductive layer 311*b* included in the pixel 410. The conductive layer 311*b* serves as a reflective electrode of the liquid crystal element in the pixel 410. The conductive layer 311*b* has an opening 451.

In FIG. 15B1, a light-emitting element 360 in a region overlapping with the conductive layer 311*b* is denoted by a dashed line. The light-emitting element 360 overlaps with the opening 451 in the conductive layer 311*b*. Thus, light from the light-emitting element 360 is emitted to a display surface side through the opening 451.

In FIG. 15B1, the pixels 410 adjacent in the direction R correspond to different colors. As illustrated in FIG. 15B1, a plurality of the openings 451 are preferably provided in different positions in the conductive layers 311*b* so as not to be aligned in one line in the plurality of pixels arranged in the direction R. This allows the two adjacent light-emitting elements 360 to be apart from each other, thereby preventing light emitted by the light-emitting element 360 from entering a coloring layer in the adjacent pixel 410 (such a phenomenon is also referred to as crosstalk). Furthermore, since the two adjacent light-emitting elements 360 can be arranged apart from each other, a high-resolution display device is achieved even when EL layers of the light-emitting elements 360 are separately formed with a shadow mask or the like.

Alternatively, arrangement illustrated in FIG. 15B2 may be employed.

If the ratio of the total area of the opening 451 to the total area except for the opening is too large, display performed with the liquid crystal element is dark. If the ratio of the total area of the opening 451 to the total area except for the opening is too small, display performed with the light-emitting element 360 is dark.

If the area of the opening 451 in the conductive layer 311*b* serving as a reflective electrode is too small, light emitted from the light-emitting element 360 is not efficiently extracted.

The shape of the opening 451 can be, for example, polygonal, quadrangular, elliptical, circular, or cross-shaped. Alternatively, the opening 451 may have a stripe shape, a slit shape, or a checkered pattern. The opening 451 may be provided close to the adjacent pixel. Preferably, the opening 451 is provided close to another pixel emitting light of the same color as that exhibited by the pixel including the opening 451, in which case crosstalk can be suppressed.

[Circuit Structure Example]

Figure 16:
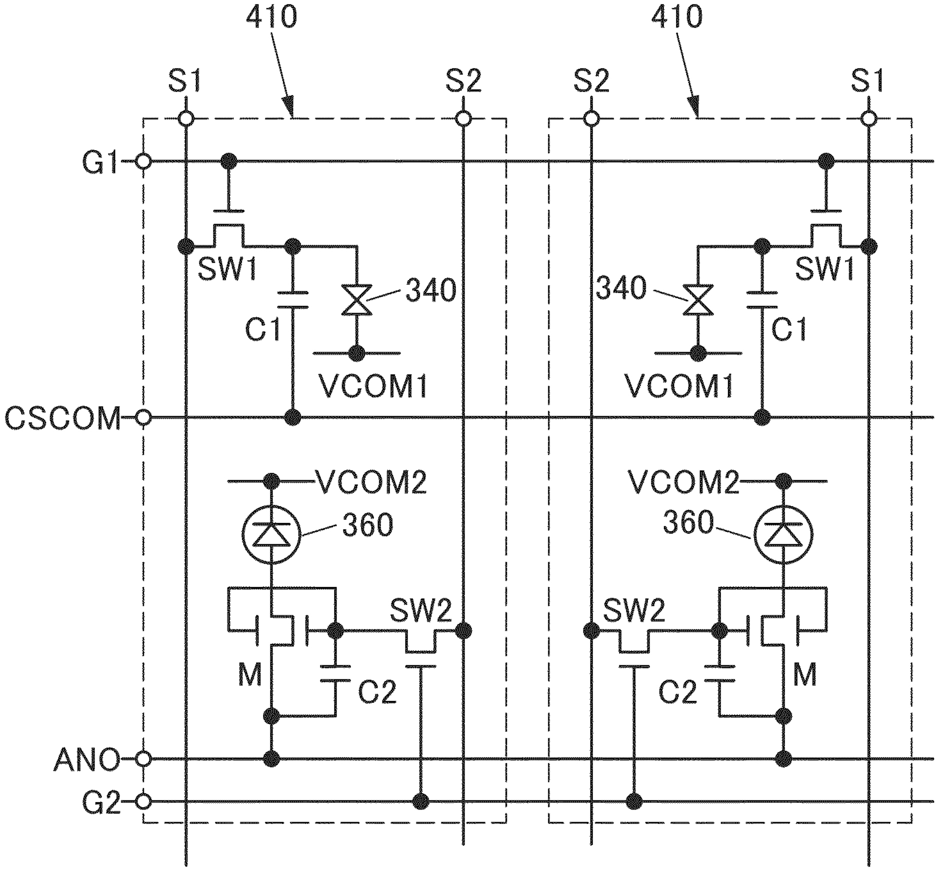
FIG. 16 illustrates a circuit of a display device.

FIG. 16 is a circuit diagram illustrating a structure example of the pixel 410. FIG. 16 shows two adjacent pixels 410.

The pixel 410 includes a switch SW1, a capacitor C1, a liquid crystal element 340, a switch SW2, a transistor M, a capacitor C2, the light-emitting element 360, and the like. The pixel 410 is electrically connected to the wiring G1, the wiring G2, the wiring ANO, the wiring CSCOM, the wiring S1, and the wiring S2. FIG. 16 illustrates a wiring VCOM1 electrically connected to the liquid crystal element 340 and a wiring VCOM2 electrically connected to the light-emitting element 360.

FIG. 16 illustrates an example in which a transistor is used as each of the switches SW1 and SW2.

A gate of the switch SW1 is connected to the wiring G1. One of a source and a drain of the switch SW1 is connected to the wiring S1, and the other of the source and the drain is connected to one electrode of the capacitor C1 and one electrode of the liquid crystal element 340. The other electrode of the capacitor C1 is connected to the wiring CSCOM. The other electrode of the liquid crystal element 340 is connected to the wiring VCOM1.

A gate of the switch SW2 is connected to the wiring G2. One of a source and a drain of the switch SW2 is connected to the wiring S2, and the other of the source and the drain is connected to one electrode of the capacitor C2 and a gate of the transistor M. The other electrode of the capacitor C2 is connected to one of a source and a drain of the transistor M and the wiring ANO. The other of the source and the drain of the transistor M is connected to one electrode of the light-emitting element 360. The other electrode of the light-emitting element 360 is connected to the wiring VCOM2.

FIG. 16 illustrates an example in which the transistor M includes two gates between which a semiconductor is provided and which are connected to each other. This structure can increase the amount of current flowing through the transistor M.

The wiring G1 can be supplied with a signal for changing the on/off state of the switch SW1. A predetermined potential can be supplied to the wiring VCOM1. The wiring S1 can be supplied with a signal for changing the orientation of a liquid crystal of the liquid crystal element 340. A predetermined potential can be supplied to the wiring CSCOM.

The wiring G2 can be supplied with a signal for changing the on/off state of the switch SW2. The wiring VCOM2 and the wiring ANO can be supplied with potentials having a difference large enough to make the light-emitting element 360 emit light. The wiring S2 can be supplied with a signal for changing the conduction state of the transistor M.

For example, in the reflective mode, the pixel 410 of FIG. 16 can be driven with the signals supplied to the wirings G1 and S1 to display an image with the use of the optical modulation of the liquid crystal element 340. In the light-emitting mode, the pixel can be driven with the signals supplied to the wirings G2 and S2 to display an image with the use of emission by the light-emitting element 360. In the case where both modes are performed at the same time, the pixel can be driven with the signals to the wiring G1, the wiring G2, the wiring S1, and the wiring S2.

Figure 17A:
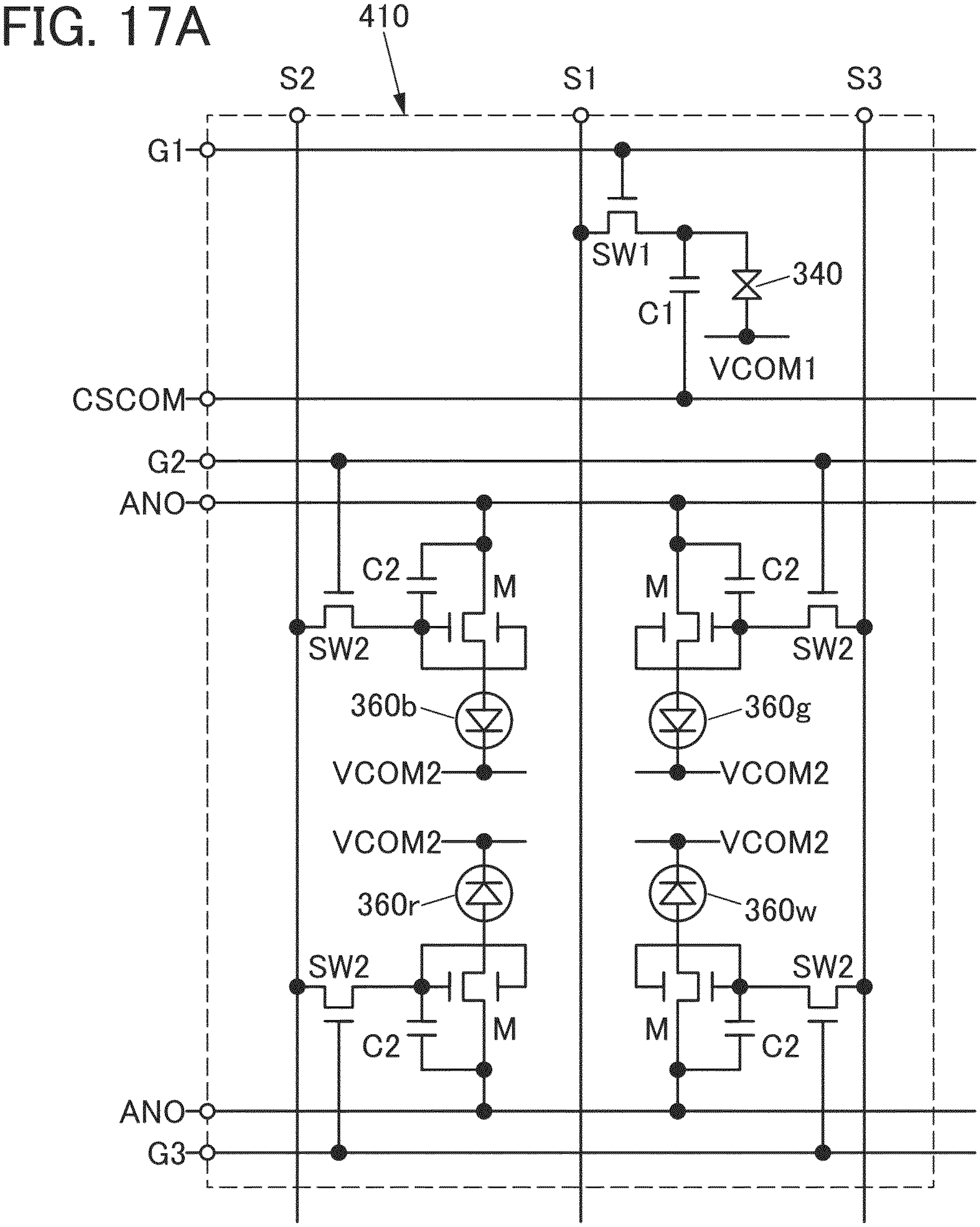
FIG. 17A illustrates a circuit of a display device and FIG. 17B is a top view of a pixel.

Although FIG. 16 illustrates an example in which one liquid crystal element 340 and one light-emitting element 360 are provided in one pixel 410, one embodiment of the present invention is not limited thereto. FIG. 17A illustrates an example in which one liquid crystal element 340 and four light-emitting elements (light-emitting elements 360*r*, 360*g*, 360*b*, and 360*w*) are provided in one pixel 410.

The structure shown in FIG. 17A, which is similar to FIG. 16, further includes a wiring G3 and a wiring S3 that are connected to the pixel 410.

In the example in FIG. 17A, light-emitting elements emitting red light (R), green light (G), blue light (B), and white light (W) can be used as the four light-emitting elements 360*r*, 360*g*, 360*b*, and 360*w*, for example. Furthermore, as the liquid crystal element 340, a reflective liquid crystal element casting white light can be used. Thus, in the case of performing display in the reflective mode, white display with high reflectivity can be performed. In the case of performing display in the light-emitting mode, images can be displayed with a high color rendering property at low power consumption.

Figure 17B:
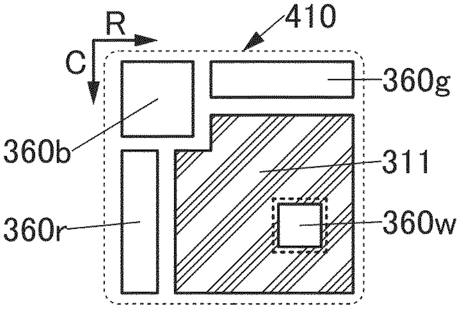

FIG. 17B illustrates a structural example of the pixel 410. The pixel 410 includes the light-emitting element 360*w* that overlaps with an opening of an electrode 311, and the light-emitting elements 360*r*, 360*g*, and 360*b* that are arranged in the periphery of the electrode 311. The light-emitting areas of the light-emitting elements 360*r*, 360*g*, and 360*b* are preferably almost equal to one another.

[Structure Example of Display Panel]

Figure 18:
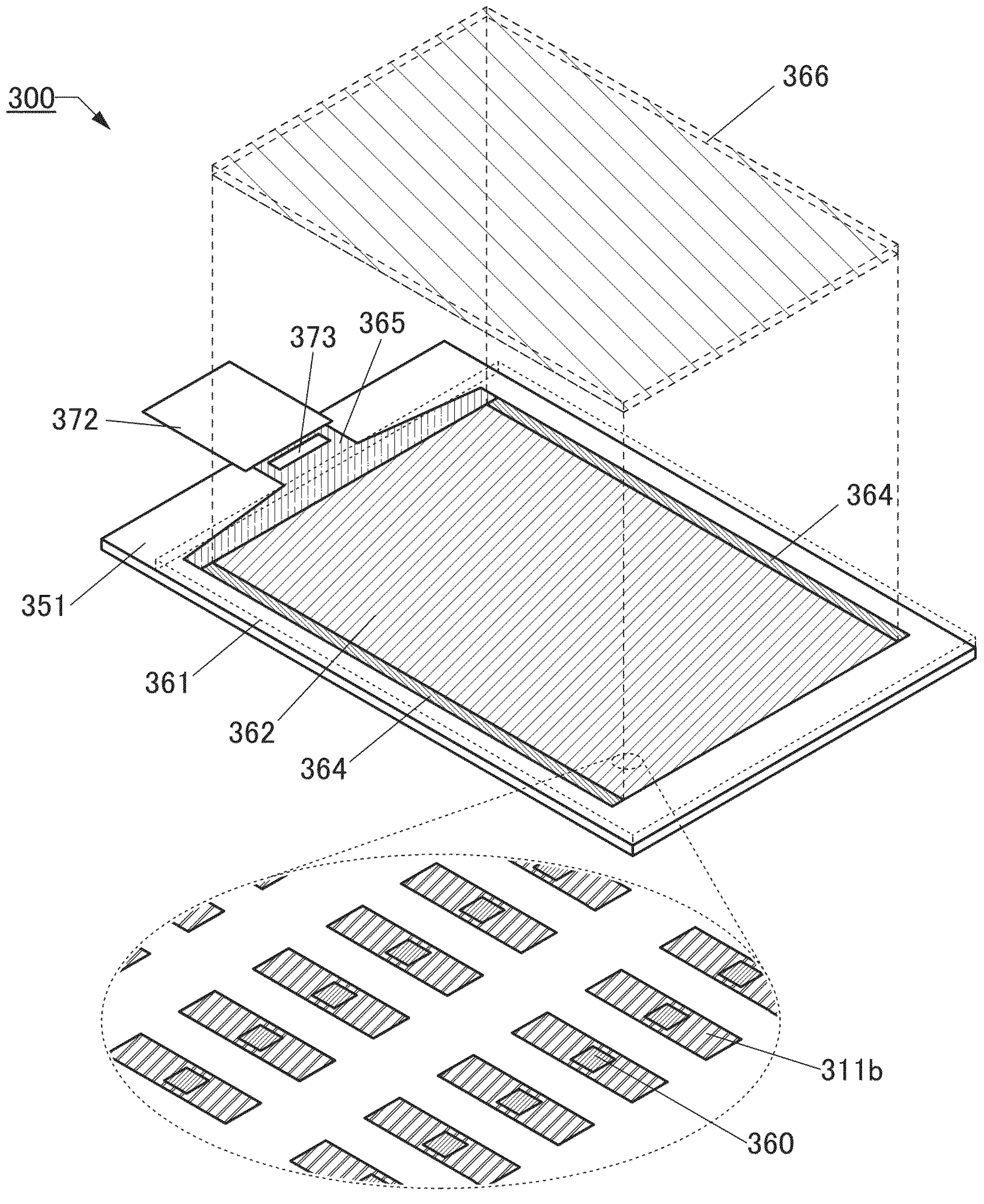
FIG. 18 illustrates a structure of a display device.

FIG. 18 is a schematic perspective view of a display panel 300 of one embodiment of the present invention. In the display panel 300, a substrate 351 and a substrate 361 are attached to each other. In FIG. 18, the substrate 361 is denoted by a dashed line.

The display panel 300 includes the display portion 362, a circuit 364, a wiring 365, and the like. The substrate 351 is provided with the circuit 364, the wiring 365, the conductive layer 311*b* that serves as a pixel electrode, and the like. In FIG. 18, an IC 373 and an FPC 372 are mounted on the substrate 351. Thus, the structure illustrated in FIG. 18 can be referred to as a display module including the display panel 300, the FPC 372, and the IC 373.

As the circuit 364, for example, a circuit functioning as a scan line driver circuit can be used.

The wiring 365 has a function of supplying signals and electric power to the display portion and the circuit 364. The signal or electric power is input to the wiring 365 from the outside through the FPC 372 or from the IC 373.

FIG. 18 shows an example in which the IC 373 is provided on the substrate 351 by a chip on glass (COG) method or the like. As the IC 373, an IC functioning as a scan line driver circuit, a signal line driver circuit, or the like can be used. Note that the IC 373 is not necessarily provided when, for example, the display panel 300 includes circuits serving as a scan line driver circuit and a signal line driver circuit or when the circuits serving as a scan line driver circuit and a signal line driver circuit are provided outside and a signal for driving the display panel 300 is input through the FPC 372. Alternatively, the IC 373 may be mounted on the FPC 372 by a chip on film (COF) method or the like.

FIG. 18 also shows an enlarged view of part of the display portion 362. The conductive layers 311*b* included in a plurality of display elements are arranged in a matrix in the display portion 362. The conductive layer 311*b* has a function of reflecting visible light and serves as a reflective electrode of the liquid crystal element 340 described later.

As illustrated in FIG. 18, the conductive layer 311*b* has an opening. The light-emitting element 360 is positioned closer to the substrate 351 than the conductive layer 311*b* is. Light is emitted from the light-emitting element 360 to the substrate 361 side through the opening in the conductive layer 311*b*.

A touch sensor may be provided over the substrate 361. For example, a sheet-like capacitive touch sensor 366 may be provided to overlap with the display portion 362. Alternatively, a touch sensor may be provided between the substrate 361 and the substrate 351. When a touch sensor is provided between the substrates 361 and 351, an optical touch sensor using a photoelectric conversion element can be used as well as a capacitive touch sensor.

[Example 1 of Cross-Sectional Structure]

Figure 19:
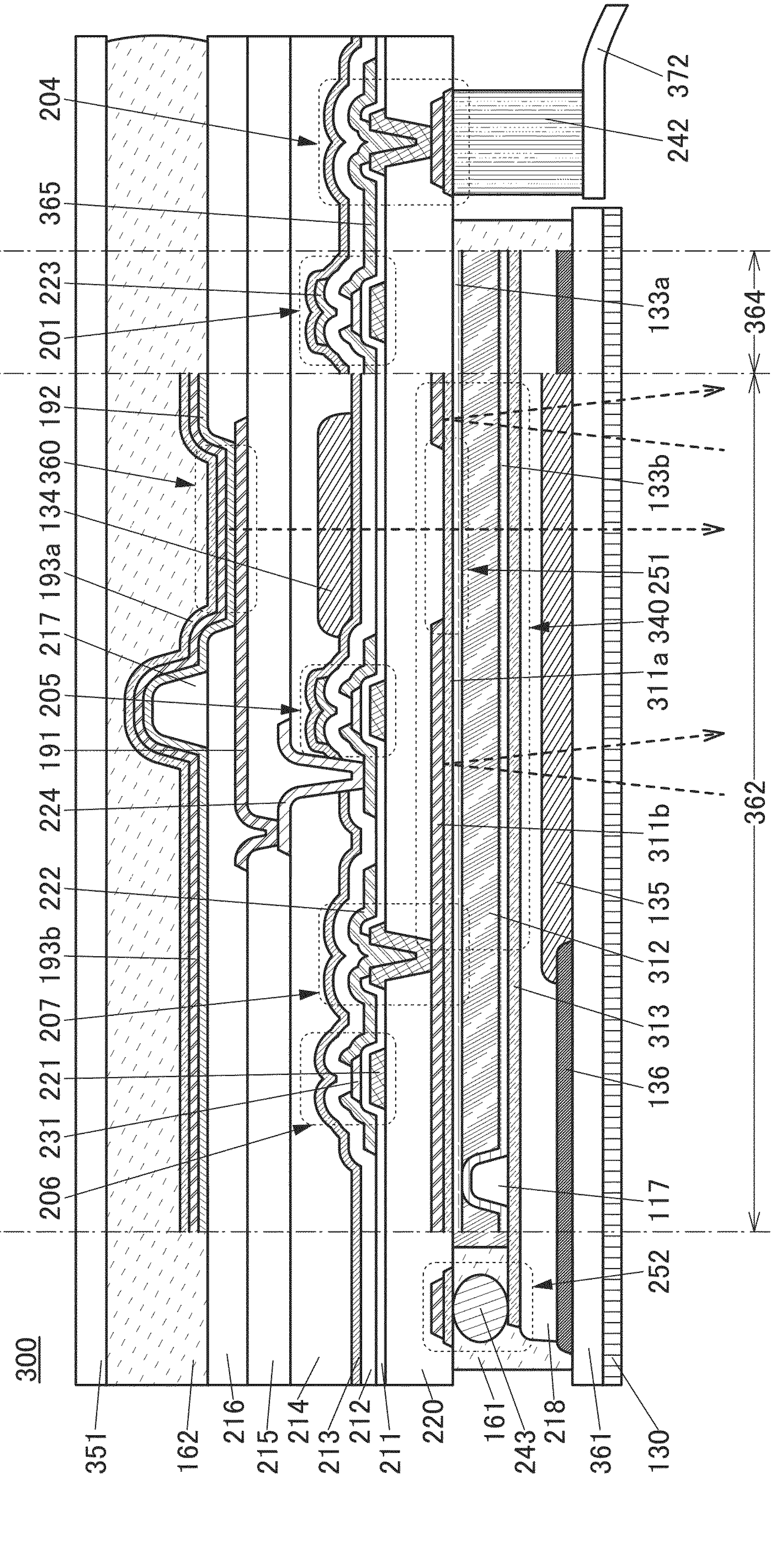
FIG. 19 illustrates a structure of a display device.

FIG. 19 shows an example of cross sections of part of a region including the FPC 372, part of a region including the circuit 364, and part of a region including the display portion 362 of the display panel illustrated in FIG. 18. Note that the touch sensor 366 is not illustrated.

The display panel includes an insulating layer 220 between the substrates 351 and 361. The display panel also includes the light-emitting element 360, a transistor 201, a transistor 205, a transistor 206, a coloring layer 134, and the like between the substrate 351 and the insulating layer 220. Furthermore, the display panel includes the liquid crystal element 340, a coloring layer 135, and the like between the insulating layer 220 and the substrate 361. The substrate 361 and the insulating layer 220 are bonded with an adhesive layer 161. The substrate 351 and the insulating layer 220 are bonded with an adhesive layer 162.

The transistor 206 is electrically connected to the liquid crystal element 340. The transistor 205 is electrically connected to the light-emitting element 360. Since the transistors 205 and 206 are formed on a surface of the insulating layer 220 that is on the substrate 351 side, the transistors 205 and 206 can be formed through the same process.

The coloring layer 135, a light-blocking layer 136, an insulating layer 218, a conductive layer 313 serving as a common electrode of the liquid crystal element 340, an alignment film 133*b*, an insulating layer 117, and the like are provided over the substrate 361. The insulating layer 117 serves as a spacer for holding a cell gap of the liquid crystal element 340.

Insulating layers such as an insulating layer 211, an insulating layer 212, an insulating layer 213, an insulating layer 214, an insulating layer 215, and the like are provided on the substrate 351 side of the insulating layer 220. Parts of the insulating layer 211 function as gate insulating layers of the transistors. The insulating layers 212, 213, and 214 are provided to cover the transistors. The insulating layer 215 is provided to cover the insulating layer 214. The insulating layers 214 and 215 each function as a planarization layer. Note that the three insulating layers, the insulating layers 212, 213, and 214, are provided to cover the transistors and the like in this example; however, one embodiment of the present invention is not limited to this example, and four or more insulating layers, a single insulating layer, or two insulating layers may be provided. The insulating layer 214 functioning as a planarization layer is not necessarily provided when not needed.

The transistors 201, 205, and 206 each include a conductive layer 221 part of which functions as a gate, conductive layers 222 parts of which function as a source and a drain, and a semiconductor layer 231. Here, a plurality of layers obtained by processing the same conductive film are shown with the same hatching pattern.

The liquid crystal element 340 is a reflective liquid crystal element. The liquid crystal element 340 has a structure in which a conductive layer 311*a*, a liquid crystal 312, and the conductive layer 313 are stacked. The conductive layer 311*b* that reflects visible light is provided in contact with the substrate 351 side of the conductive layer 311*a*. The conductive layer 311*b* includes an opening 251. The conductive layers 311*a* and 313 each contain a material transmitting visible light. In addition, an alignment film 133*a* is provided between the liquid crystal 312 and the conductive layer 311*a* and the alignment film 133*b* is provided between the liquid crystal 312 and the conductive layer 313. A polarizing plate 130 is provided on an outer surface of the substrate 361.

In the liquid crystal element 340, the conductive layer 311*b* has a function of reflecting visible light, and the conductive layer 313 has a function of transmitting visible light. Light entering from the substrate 361 side is polarized by the polarizing plate 130, passes through the conductive layer 313 and the liquid crystal 312, and is reflected by the conductive layer 311*b*. Then, the light passes through the liquid crystal 312 and the conductive layer 313 again and reaches the polarizing plate 130. Here, the alignment of the liquid crystal is controlled by voltage applied between the conductive layer 311*b* and the conductive layer 313, whereby optical modulation of light can be controlled. That is, the intensity of light casted through the polarizing plate 130 can be controlled. Light other than one in a particular wavelength region is absorbed by the coloring layer 135, and thus, extracted light exhibits, for example, red light.

The light-emitting element 360 is a bottom-emission light-emitting element. The light-emitting element 360 has a structure in which a conductive layer 191, an EL layer 192, and a conductive layer 193*b* are stacked in this order from the insulating layer 220 side. In addition, a conductive layer 193*a* is provided to cover the conductive layer 193*b*. The conductive layer 193*b* contains a material reflecting visible light, and the conductive layers 191 and 193*a* each contain a material transmitting visible light. Light is emitted from the light-emitting element 360 to the substrate 361 side through the coloring layer 134, the insulating layer 220, the opening 251, the conductive layer 313, and the like.

Here, as illustrated in FIG. 19, the conductive layer 311*a* transmitting visible light is preferably provided for the opening 251. Accordingly, the liquid crystal 312 is aligned in a region overlapping with the opening 251 as in the other regions, which prevents an alignment defect of the liquid crystal in the boundary portion of these regions and reduces undesired light leakage.

As the polarizing plate 130 provided on an outer surface of the substrate 361, a linear polarizing plate or a circularly polarizing plate can be used. An example of a circularly polarizing plate is a stack including a linear polarizing plate and a quarter-wave retardation plate. Such a structure can reduce reflection of external light. A light diffusion plate may be provided to reduce reflection of external light. The cell gap, alignment, drive voltage, and the like of the liquid crystal element used as the liquid crystal element 340 are controlled depending on the kind of the polarizing plate so that desirable contrast is obtained.

An insulating layer 217 is provided over the insulating layer 216 covering an end portion of the conductive layer 191. The insulating layer 217 has a function as a spacer for preventing the insulating layer 220 and the substrate 351 from getting closer than necessary. In addition, in the case where the EL layer 192 or the conductive layer 193*a* is formed using a blocking mask (metal mask), the insulating layer 217 may have a function of preventing the blocking mask from being in contact with a surface on which the EL layer 192 or the conductive layer 193*a* is formed. Note that the insulating layer 217 is not necessarily provided.

One of a source and a drain of the transistor 205 is electrically connected to the conductive layer 191 of the light-emitting element 360 through a conductive layer 224.

One of a source and a drain of the transistor 206 is electrically connected to the conductive layer 311*b* through a connection portion 207. The conductive layers 311*b* and 311*a* are in contact with and electrically connected to each other. Here, in the connection portion 207, the conductive layers provided on both surfaces of the insulating layer 220 are connected to each other through an opening in the insulating layer 220.

A connection portion 204 is provided in a region in which the substrate 351 and the substrate 361 do not overlap with each other. The connection portion 204 is electrically connected to the FPC 372 through a connection layer 242. The connection portion 204 has a structure similar to that of the connection portion 207. On the surface of the connection portion 204, a conductive layer obtained by processing the same conductive film as the conductive layer 311*a* is exposed. Thus, the connection portion 204 and the FPC 372 can be electrically connected to each other through the connection layer 242.

A connection portion 252 is provided in part of a region where the adhesive layer 161 is provided. In the connection portion 252, the conductive layer obtained by processing the same conductive film as the conductive layer 311*a* is electrically connected to part of the conductive layer 313 with a connector 243. Accordingly, a signal or a potential input from the FPC 372 connected to the substrate 351 side can be supplied to the conductive layer 313 formed on the substrate 361 side through the connection portion 252.

As the connector 243, a conductive particle can be used, for example. As the conductive particle, a particle of an organic resin, silica, or the like coated with a metal material can be used. It is preferable to use nickel or gold, which can reduce contact resistance, as the metal material. It is also preferable to use a particle coated with layers of two or more kinds of metal materials, such as a particle coated with nickel and further with gold. As the connector 243, a material capable of elastic deformation or plastic deformation is preferably used. As illustrated in FIG. 19, the connector 243 that is the conductive particle has a shape that is vertically crushed in some cases. With the crushed shape, the contact area between the connector 243 and a conductive layer electrically connected to the connector 243 can be increased, thereby reducing contact resistance and suppressing the generation of problems such as disconnection.

The connector 243 is preferably provided to be covered with the adhesive layer 161. For example, the connectors 243 are dispersed in the adhesive layer 161 that is not yet cured.

FIG. 19 illustrates an example where the circuit 364 includes the transistor 201.

In the example of FIG. 19, the transistors 201 and 205 each have a structure in which the semiconductor layer 231 where a channel is formed is provided between two gates. One gate is formed by the conductive layer 221 and the other gate is formed by a conductive layer 223 overlapping with the semiconductor layer 231 with the insulating layer 212 provided therebetween. Such a structure enables control of threshold voltages of the transistors. In that case, the two gates may be connected to each other and supplied with the same signal to operate the transistors. Such transistors can have a higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display panel with the increased number of wirings due to increase in size or definition.

Note that the transistor included in the circuit 364 and the transistor included in the display portion 362 may have the same structure. A plurality of transistors included in the circuit 364 may have the same structure or different structures. A plurality of transistors included in the display portion 362 may have the same structure or different structures.

A material through which impurities such as water or hydrogen do not easily diffuse is preferably used for at least one of the insulating layers 212 and 213 that cover the transistors. That is, the insulating layer 212 or the insulating layer 213 can function as a barrier film. Such a structure can effectively suppress diffusion of the impurities into the transistors from the outside, and a highly reliable display panel can be provided.

The insulating layer 218 is provided on the substrate 361 side to cover the coloring layer 135 and the light-blocking layer 136. The insulating layer 218 may have a function as a planarization layer. The insulating layer 218 enables the conductive layer 313 to have an almost flat surface, resulting in a uniform alignment state of the liquid crystal 312.

[Example 2 of Cross-Sectional Structure]

Figure 20:
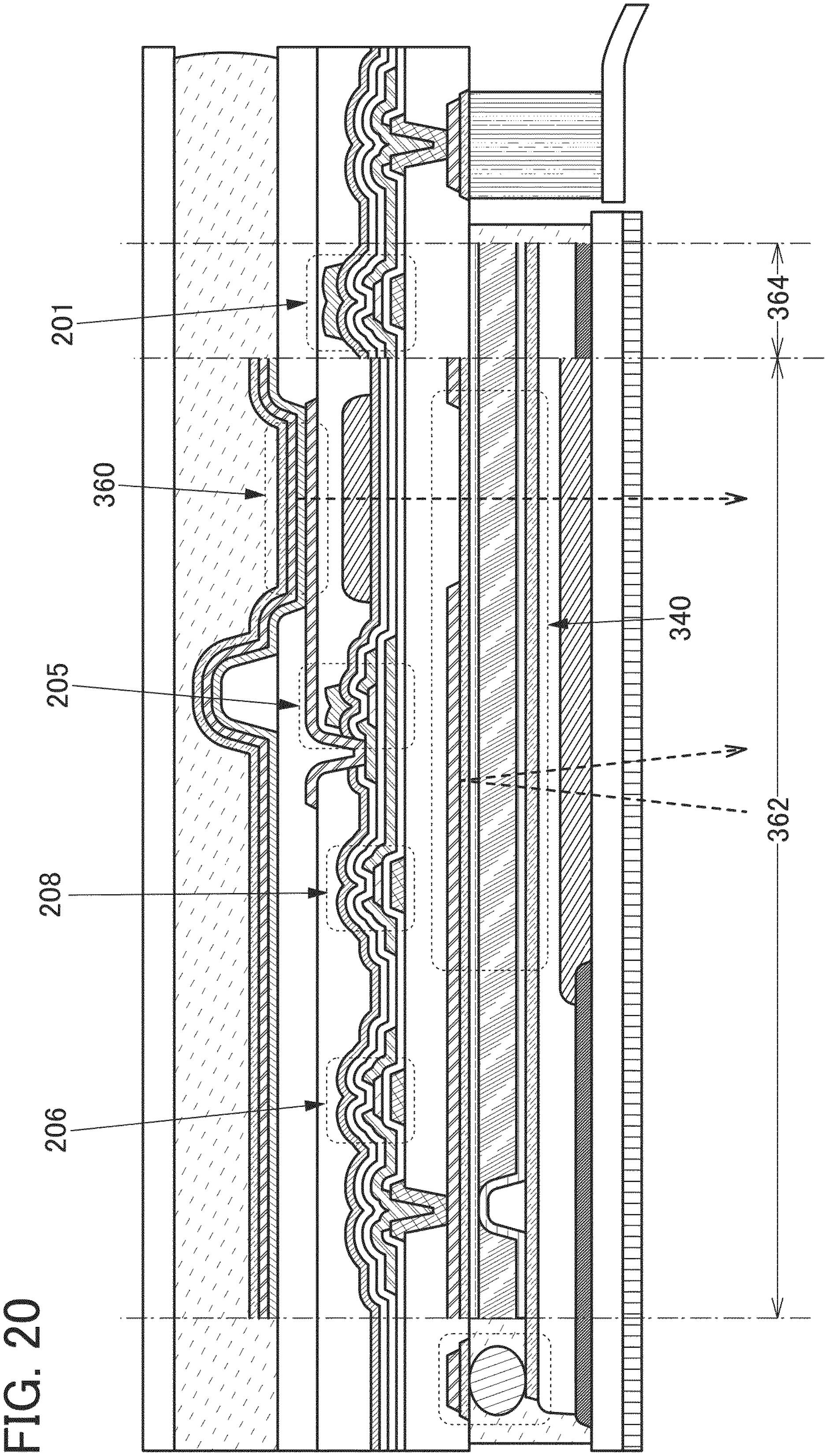
FIG. 20 illustrates a structure of a display device.

The display panel of one embodiment of the present invention may include a region where a first transistor and a second transistor that are provided in a pixel overlap with each other as illustrated in FIG. 20. Such a structure enables a fabrication of a display panel having a reduced area per pixel and a high pixel density that can display a high definition image.

For example, the display panel can include a region where the transistor 205 for driving the light-emitting element 360 and the transistor 208 overlap with each other. Alternatively, the display panel can include a region where the transistor 206 for driving the liquid crystal element 340 and one of the transistors 205 and 208 overlap with each other.

[Example 3 of Cross-Sectional Structure]

Figure 21:
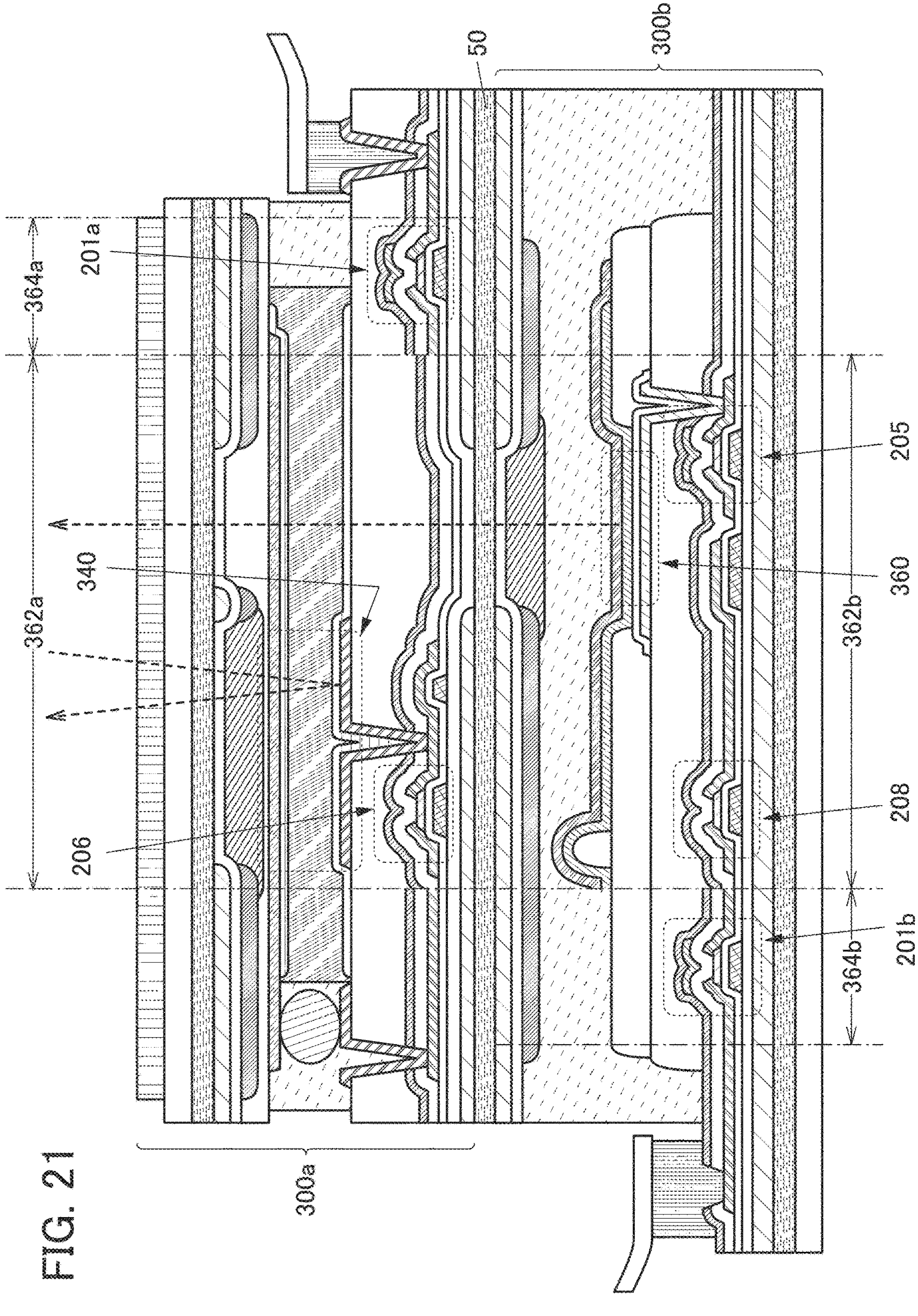
FIG. 21 illustrates a structure of a display device.

In the display panel of one embodiment of the present invention, a display panel 300*a* and a display panel 300*b* may be bonded to each other through an adhesive layer 50 as illustrated in FIG. 21. The display panel 300*a* includes the liquid crystal element 340 and the transistor 206 in a display portion 362*a*, and a transistor 201*a* in a circuit 364*a* for driving the display portion 362*a*. The display panel 300*b* includes the light-emitting element 360 and the transistors 205 and 208 in a display portion 362*b*, and a transistor 201*b* in a circuit 364*b* for driving the display portion 362*b*.

With such a structure, suitable manufacturing steps can be used for each of the display panels 300*a* and 300*b*, which leads to improvement in manufacturing yield.

[Components]

The above components will be described below.

[Substrate]

A material having a flat surface can be used as the substrate included in the display panel. The substrate through which light from the display element is extracted is formed using a material that transmits the light. For example, a material such as glass, quartz, ceramic, sapphire, or an organic resin can be used.

The weight and thickness of the display panel can be decreased by using a thin substrate. A flexible display panel can be obtained by using a substrate that is thin enough to have flexibility.

Since the substrate through which light is not extracted does not need to have a light-transmitting property, a metal substrate or the like can be used as well as the above-mentioned substrates. A metal material, which has high thermal conductivity, is preferable because it can easily conduct heat to the whole substrate and accordingly can prevent a local temperature rise in the display panel. To obtain flexibility or bendability, the thickness of a metal substrate is preferably greater than or equal to 10 μm and less than or equal to 200 μm, more preferably greater than or equal to 20 μm and less than or equal to 50 μm.

Although there is no particular limitation on a material of a metal substrate, it is favorable to use, for example, a metal such as aluminum, copper, or nickel, or an alloy such as an aluminum alloy or stainless steel.

It is preferable to use a substrate subjected to insulation treatment, e.g., a metal substrate whose surface is oxidized or provided with an insulating film. The insulating film may be formed by, for example, a coating method such as a spin-coating method or a dipping method, an electrodeposition method, an evaporation method, or a sputtering method. An oxide film may be formed on the substrate surface by exposure to or heating in an oxygen atmosphere or by an anodic oxidation method or the like.

Examples of a material that has flexibility and transmits visible light include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). In particular, a material with a low thermal expansion coefficient is preferred, and for example, a polyamide imide resin, a polyimide resin, or PET with a thermal expansion coefficient of $30\times10^{-6}$/K or less can be suitably used. A substrate in which a glass fiber is impregnated with an organic resin or a substrate whose thermal expansion coefficient is reduced by mixing an organic resin with an inorganic filler can also be used. A substrate using such a material is light in weight, and thus a display panel using this substrate can also be light in weight.

In the case where a fibrous body is included in the above material, a high-strength fiber of an organic compound or an inorganic compound is used as the fibrous body. The high-strength fiber is specifically a fiber with a high tensile elastic modulus or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, a glass fiber using E glass, S glass, D glass, Q glass, and the like can be given. These fibers may be used in a state of a woven or nonwoven fabric, and a structure body formed by impregnating the fibrous body with a resin and curing the resin may be used as the flexible substrate. The structure body including the fibrous body and the resin is preferably used as the flexible substrate, in which case the reliability against breaking due to bending or local pressure can be increased.

Alternatively, glass, metal, or the like that is thin enough to have flexibility can be used as the substrate. Alternatively, a composite material where glass and a resin material are attached to each other through an adhesive layer may be used.

A hard coat layer (e.g., a silicon nitride layer or an aluminum oxide layer) by which a surface of a display panel is protected from damage, a layer (e.g., an aramid resin layer) that can disperse pressure, or the like may be stacked over the flexible substrate. Furthermore, to suppress a decrease in lifetime of the display element due to moisture and the like, an insulating film with a low water permeability may be stacked over the flexible substrate. For example, an inorganic insulating material such as silicon nitride, silicon oxynitride, silicon nitride oxide, aluminum oxide, or aluminum nitride can be used.

The substrate may be formed by stacking a plurality of layers. When a glass layer is used, a barrier property against water and oxygen can be improved and thus a highly reliable display panel can be provided.

[Transistor]

The transistors each include the conductive layer functioning as a gate electrode, the semiconductor layer, the conductive layer functioning as a source electrode, the conductive layer functioning as a drain electrode, and the insulating layer functioning as a gate insulating layer. In the above, a bottom-gate transistor is used.

Note that there is no particular limitation on the structure of the transistor included in the display device of one embodiment of the present invention. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. A semiconductor having crystallinity is preferably used, in which case deterioration of the transistor characteristics can be suppressed.

As a semiconductor material used for the transistors, a metal oxide whose energy gap is greater than or equal to 2 eV, preferably greater than or equal to 2.5 eV, further preferably greater than or equal to 3 eV can be used. A typical example thereof is an oxide semiconductor containing indium, and for example, a CAC-OS described later or the like can be used.

A transistor with an oxide semiconductor having a larger band gap and a lower carrier density than silicon has a low off-state current and therefore charges stored in a capacitor that is series-connected to the transistor can be held for a long time.

The semiconductor layer can be, for example, a film represented by an In-M-Zn-based oxide, which contains at least indium, zinc, and M (a metal such as aluminum, titanium, gallium, germanium, yttrium, zirconium, lanthanum, cerium, tin, neodymium, or hafnium).

In the case where the oxide semiconductor contained in the semiconductor layer contains an In-M-Zn-based oxide, it is preferable that the atomic ratio of metal elements of a sputtering target used for forming a film of the In-M-Zn oxide satisfy In≥M and Zn≥M. The atomic ratio of metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio of metal elements in the formed oxide semiconductor layer varies from the above atomic ratios of metal elements of the sputtering targets in a range of +40%.

The bottom-gate transistor described in this embodiment is preferable to reduce the number of manufacturing steps. When an oxide semiconductor, which can be formed at a lower temperature than polycrystalline silicon, is used, materials with low heat resistance can be used for a wiring, an electrode, or a substrate below the semiconductor layer, so that the range of choices of materials can be widened. For example, an extremely large glass substrate can be favorably used.

An oxide semiconductor film with a low carrier density is used as the semiconductor layer. For example, the semiconductor layer is an oxide semiconductor film whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, even further preferably lower than $1\times10^{10}/cm^3$, and higher than or equal to $1\times10^{-9}/cm^3$. Such an oxide semiconductor is referred to as a highly purified intrinsic or substantially highly purified intrinsic oxide semiconductor. The oxide semiconductor has a low impurity concentration and a low density of defect states and thus can be referred to as an oxide semiconductor having stable characteristics.

However, the composition is not limited to those described above, and a material having the appropriate composition may be used depending on required semiconductor characteristics and electrical characteristics of the transistor (e.g., field-effect mobility and threshold voltage). To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the oxide semiconductor included in the semiconductor layer, the semiconductor layer includes an increased number of oxygen vacancies, and thus becomes n-type. Thus, the concentration of silicon or carbon (measured by secondary ion mass spectrometry) in the semiconductor layer is set to lower than or equal to $2\times10^{18}$ atoms/cm$^3$, preferably lower than or equal to $2\times10^{17}$ atoms/cm$^3$.

Alkali metal and alkaline earth metal can generate carriers when bonded to the oxide semiconductor, which can increase the off-state current of the transistor. Therefore, the concentration of alkali metal or alkaline earth metal in the semiconductor layer, which is measured by secondary ion mass spectrometry, is set to lower than or equal to $1\times10^{18}$ atoms/cm$^3$, preferably lower than or equal to $2\times10^{16}$ atoms/cm$^3$.

When nitrogen is contained in the oxide semiconductor included in the semiconductor layer, electrons serving as carriers are generated and the carrier density increases, so that the semiconductor layer easily becomes n-type. Thus, a transistor including the oxide semiconductor that contains nitrogen is likely to be normally-on. Hence, the concentration of nitrogen in the semiconductor layer, which is measured by secondary ion mass spectrometry, is preferably set to lower than or equal to $5\times10^{18}$ atoms/cm$^3$.

The semiconductor layer may have a non-single-crystal structure, for example. The non-single-crystal structure includes CAAC-OS (c-axis aligned crystalline oxide semiconductor, or c-axis aligned a-b-plane-anchored crystalline oxide semiconductor) including a c-axis aligned crystal, a polycrystalline structure, a microcrystalline structure, or an amorphous structure, for example. Among the non-single-crystal structures, the amorphous structure has the highest density of defect states, whereas CAAC-OS has the lowest density of defect states.

An oxide semiconductor film having an amorphous structure has, for example, disordered atomic arrangement and no crystalline component. An oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, a region of CAAC-OS, and a region having a single-crystal structure. The mixed film has, for example, a single-layer structure or a stacked-layer structure including two or more of the above regions.

<Composition of CAC-OS>

The composition of a cloud-aligned composite oxide semiconductor (CAC-OS) applicable to a transistor disclosed in one embodiment of the present invention will be described below.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that the oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to the element M in a second region, the first region has a higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1\leq x0\leq 1$; m0 is a given number).

The above crystalline compounds have a single-crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where intentional heating is not performed on a substrate, for example. In the case where the CAC-OS is formed by a sputtering method, one or more of an inert gas (typically, argon), an oxygen gas, and a nitrogen gas is used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In the CAC-OS, an electron diffraction pattern that is obtained by irradiation with an electron beam with a probe diameter of 1 nm (also referred to as nanobeam electron beam) has regions with high luminance in a ring pattern and a plurality of bright spots appear in the ring-like pattern. Therefore, the electron diffraction pattern indicates that the crystal structure of the CAC-OS includes a nanocrystal (nc) structure with no alignment in plan-view and cross-sectional directions.

For example, energy dispersive X-ray spectroscopy (EDX) is used to obtain EDX mapping, and according to the EDX mapping, the CAC-OS of the In—Ga—Zn oxide has a composition in which the regions including $GaO_{X3}$ as a main component and the regions including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices typified by a display.

Alternatively, silicon may be used as a semiconductor in which a channel of a transistor is formed. Silicon may be amorphous silicon but is preferably silicon having crystallinity, such as microcrystalline silicon, polycrystalline silicon, or single-crystal silicon. In particular, polycrystalline silicon can be formed at a lower temperature than single-crystal silicon and has higher field-effect mobility and higher reliability than amorphous silicon.

The bottom-gate transistor described in this embodiment is preferable to reduce the number of manufacturing steps. When amorphous silicon, which can be formed at a lower temperature than polycrystalline silicon, is used for the semiconductor layer, materials with low heat resistance can be used for a wiring, an electrode, or a substrate below the semiconductor layer, resulting in wider choice of materials. For example, an extremely large glass substrate can be favorably used. Meanwhile, a top-gate transistor is preferable to form an impurity region with ease in a self-aligned manner and reduce variation in characteristics. The top-gate transistor is particularly preferable when polycrystalline silicon, single-crystal silicon, or the like is employed.

[Conductive Layer]

Examples of materials for a gate, a source, and a drain of a transistor, and a conductive layer such as a wiring or an electrode included in a display device include any of metals such as aluminum, titanium, chromium, nickel, copper, yttrium, zirconium, molybdenum, silver, tantalum, and tungsten, and an alloy containing any of these metals as its main component. A single-layer structure or multi-layer structure including a film containing any of these materials can be used. For example, the following structures can be employed: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because it increases shape controllability in etching.

Examples of a light-transmitting conductive material include a conductive oxide such as indium oxide, indium tin oxide, indium zinc oxide, zinc oxide, or zinc oxide to which gallium is added, and graphene. It is also possible to use, for example, a metal material such as gold, silver, platinum, magnesium, nickel, tungsten, chromium, molybdenum, iron, cobalt, copper, palladium, or titanium; an alloy material containing any of these metal materials; or a nitride of any of these metal materials (e.g., titanium nitride). In the case of using the metal material or the alloy material (or the nitride thereof), the film thickness is set small enough to transmit light. Alternatively, a stacked film of any of the above materials can be used for the conductive layers. For example, a stacked film of indium tin oxide and an alloy of silver and magnesium is preferably used because it can increase the conductivity. These materials can also be used for conductive layers such as a variety of wirings and electrodes included in a display device, and conductive layers (e.g., conductive layers serving as a pixel electrode or a common electrode) included in a display element.

[Insulating Layer]

Examples of an insulating material that can be used for the insulating layers include a resin such as acrylic or epoxy resin, a resin having a siloxane bond, and an inorganic insulating material such as silicon oxide, silicon oxynitride, silicon nitride oxide, silicon nitride, or aluminum oxide.

The light-emitting element is preferably provided between a pair of insulating films with low water permeability, in which case impurities such as water can be prevented from entering the light-emitting element. Thus, a decrease in device reliability can be prevented.

Examples of the insulating film with low water permeability include a film containing nitrogen and silicon (e.g., a silicon nitride film and a silicon nitride oxide film) and a film containing nitrogen and aluminum (e.g., an aluminum nitride film). Alternatively, a silicon oxide film, a silicon oxynitride film, an aluminum oxide film, or the like may be used.

For example, the moisture vapor transmission rate of the insulating film with low water permeability is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], still further preferably lower than or equal to $1\times10^{-8}$ [g/(m$^2$·day)].

[Liquid Crystal Element]

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ any of a variety of modes. For example, the liquid crystal element can employ a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like, instead of employing a vertical alignment (VA) mode.

The liquid crystal element controls transmission or non-transmission of light with the use of an optical modulation action of a liquid crystal. The optical modulation action of a liquid crystal is controlled by an electric field applied to the liquid crystal (including a horizontal electric field, a vertical electric field, and an oblique electric field). Examples of the liquid crystal used for the liquid crystal element include thermotropic liquid crystal, low-molecular liquid crystal, high-molecular liquid crystal, polymer dispersed liquid crystal (PDLC), ferroelectric liquid crystal, and anti-ferroelectric liquid crystal. Such a liquid crystal material exhibits a cholesteric phase, a smectic phase, a cubic phase, a chiral nematic phase, an isotropic phase, or the like depending on conditions.

As the liquid crystal material, a positive liquid crystal or a negative liquid crystal may be used, and an appropriate liquid crystal material is selected depending on the mode or design to be employed.

An alignment film can be provided to adjust the alignment of a liquid crystal. In the case where a horizontal electric field mode is employed, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition that includes liquid crystal exhibiting a blue phase and a chiral material has a short response time and optical isotropy; in addition, such a liquid crystal composition does not require the alignment process and has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

The liquid crystal element may be a transmissive liquid crystal element, a reflective liquid crystal element, a semi-transmissive liquid crystal element, or the like.

In one embodiment of the present invention, the reflective liquid crystal element can be particularly used.

In the case where a transmissive or semi-transmissive liquid crystal element is used, two polarizing plates are provided such that a pair of substrates are sandwiched therebetween. Furthermore, a backlight is provided on the outer side of the polarizing plate. As the backlight, a direct-below backlight or an edge-light backlight may be used. It is preferable to use a direct-below backlight including an LED, with which local dimming can be easily performed and contrast can be increased. The edge-light type backlight is preferably used to reduce the thickness of a module including the backlight.

In the case where a reflective liquid crystal element is used, a polarizing plate is provided on a display surface. In addition, a light diffusion plate is preferably provided on the display surface to improve visibility.

In the case where the reflective or the semi-transmissive liquid crystal element is used, a front light may be provided outside the polarizing plate. As the front light, an edge-light front light is preferably used. A front light including an LED is preferably used to reduce power consumption.

[Light-Emitting Element]

As the light-emitting element, a self-luminous element can be used, and an element whose luminance is controlled by current or voltage is included in the category of the light-emitting element. For example, an LED, an organic EL element, an inorganic EL element, or the like can be used.

The light-emitting element has a top emission structure, a bottom emission structure, a dual emission structure, or the like. A conductive film that transmits visible light is used as the electrode through which light is extracted. A conductive film that reflects visible light is preferably used as the electrode through which light is not extracted.

The EL layer includes at least a light-emitting layer. In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer, either a low-molecular compound or a high-molecular compound can be used, and an inorganic compound may also be used. Each of the layers included in the EL layer can be formed by any of the following methods: an evaporation method (including a vacuum evaporation method), a transfer method, a printing method, an inkjet method, a coating method, and the like.

When a voltage higher than the threshold voltage of the light-emitting element is applied between a cathode and an anode, holes are injected to the EL layer from the anode side and electrons are injected to the EL layer from the cathode side. The injected electrons and holes are recombined in the EL layer and a light-emitting substance contained in the EL layer emits light.

In the case where a light-emitting element emitting white light is used as the light-emitting element, the EL layer preferably contains two or more kinds of light-emitting substances. For example, the two or more kinds of light-emitting substances are selected so as to emit light of complementary colors to obtain white light emission. Specifically, it is preferable to contain two or more selected from light-emitting substances emitting light of red (R), green (G), blue (B), yellow (Y), orange (O), and the like and light-emitting substances emitting light containing two or more of spectral components of R, G, and B. The light-emitting element preferably emits light with a spectrum having two or more peaks in the wavelength range of a visible light region (e.g., 350 nm to 750 nm). An emission spectrum of a material emitting light having a peak in a yellow wavelength range preferably includes spectral components also in green and red wavelength ranges.

A light-emitting layer containing a light-emitting material emitting light of one color and a light-emitting layer containing a light-emitting material emitting light of another color are preferably stacked in the EL layer. For example, a plurality of light-emitting layers in the EL layer may be stacked in contact with each other or may be stacked with a region not including any light-emitting material therebetween. For example, between a fluorescent layer and a phosphorescent layer, a region containing no light-emitting element but the same material as one in the fluorescent layer or phosphorescent layer (for example, a host material or an assist material) may be provided. This facilitates the manufacture of the light-emitting element and reduces the drive voltage.

The light-emitting element may be a single element including one EL layer or a tandem element in which a plurality of EL layers are stacked with a charge generation layer therebetween.

The conductive film that transmits visible light can be formed using, for example, indium oxide, indium tin oxide, indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) that is thin enough to have a light-transmitting property can be used. Alternatively, a stacked film of any of the above materials can be used for the conductive layer. For example, a stacked film of indium tin oxide and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. Alternatively, an alloy containing aluminum (an aluminum alloy) such as an alloy of aluminum and titanium, an alloy of aluminum and nickel, or an alloy of aluminum and neodymium may be used. Alternatively, an alloy containing silver such as an alloy of silver and copper, an alloy of silver and palladium, or an alloy of silver and magnesium may be used. An alloy containing silver and copper is preferable because of its high heat resistance. Furthermore, when a metal film or a metal oxide film is stacked in contact with an aluminum film or an aluminum alloy film, oxidation can be suppressed. Examples of a material for the metal film or the metal oxide film include titanium and titanium oxide. Alternatively, the above conductive film that transmits visible light and a film containing a metal material may be stacked. For example, a stack of indium tin oxide and silver, a stack of indium tin oxide and an alloy of silver and magnesium, or the like can be used.

Each of the electrodes can be formed by an evaporation method or a sputtering method. Alternatively, a discharging method such as an inkjet method, a printing method such as a screen printing method, or a plating method may be used.

Note that the aforementioned light-emitting layer and layers containing a substance with a high hole-injection property, a substance with a high hole-transport property, a substance with a high electron-transport property, a substance with a high electron-injection property, and a substance with a bipolar property may include an inorganic compound such as a quantum dot or a high molecular compound (e.g., an oligomer, a dendrimer, and a polymer). For example, a quantum dot included in the light-emitting layer can serve as a light-emitting material.

The quantum dot may be a colloidal quantum dot, an alloyed quantum dot, a core-shell quantum dot, a core quantum dot, or the like. The quantum dot containing elements belonging to Groups 12 and 16, elements belonging to Groups 13 and 15, or elements belonging to Groups 14 and 16, may be used. Alternatively, the quantum dot containing an element such as cadmium, selenium, zinc, sulfur, phosphorus, indium, tellurium, lead, gallium, arsenic, or aluminum may be used.

[Adhesive Layer]

As the adhesive layer, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PV B) resin, an ethylene vinyl acetate (EVA) resin, and the like. In particular, a material with low moisture permeability, such as an epoxy resin, is preferred. Alternatively, a two-component resin may be used. Still alternatively, an adhesive sheet or the like may be used.

Furthermore, the above-mentioned resin may include a drying agent. For example, a substance that adsorbs moisture by chemical adsorption, such as oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent impurities such as moisture from entering the element and improves the reliability of the display panel.

In addition, the resin is preferably mixed with a filler with a high refractive index or a light-scattering member, in which case light extraction efficiency can be enhanced. For example, titanium oxide, barium oxide, zeolite, zirconium, or the like can be used.

[Connection Layer]

As the connection layers, an anisotropic conductive film (ACF), an anisotropic conductive paste (ACP), or the like can be used.

[Coloring Layer]

Examples of a material that can be used for the coloring layers include a metal material, a resin material, and a resin material containing a pigment or dye.

[Light-Blocking Layer]

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure of a film containing a material of a coloring layer that transmits light of a certain color and a film containing a material of a coloring layer which transmits light of another color can be employed. The coloring layer and the light-blocking layer are preferably formed using the same material, in which case the same manufacturing apparatus can be used and the process can be simplified.

At least part of this embodiment can be implemented in combination with any of the other embodiments and the other examples described in this specification as appropriate.

Embodiment 4

A structure of an input/output panel of one embodiment of the present invention will be described with reference to FIG. 22 and FIGS. 23A to 23D.

Figure 22:
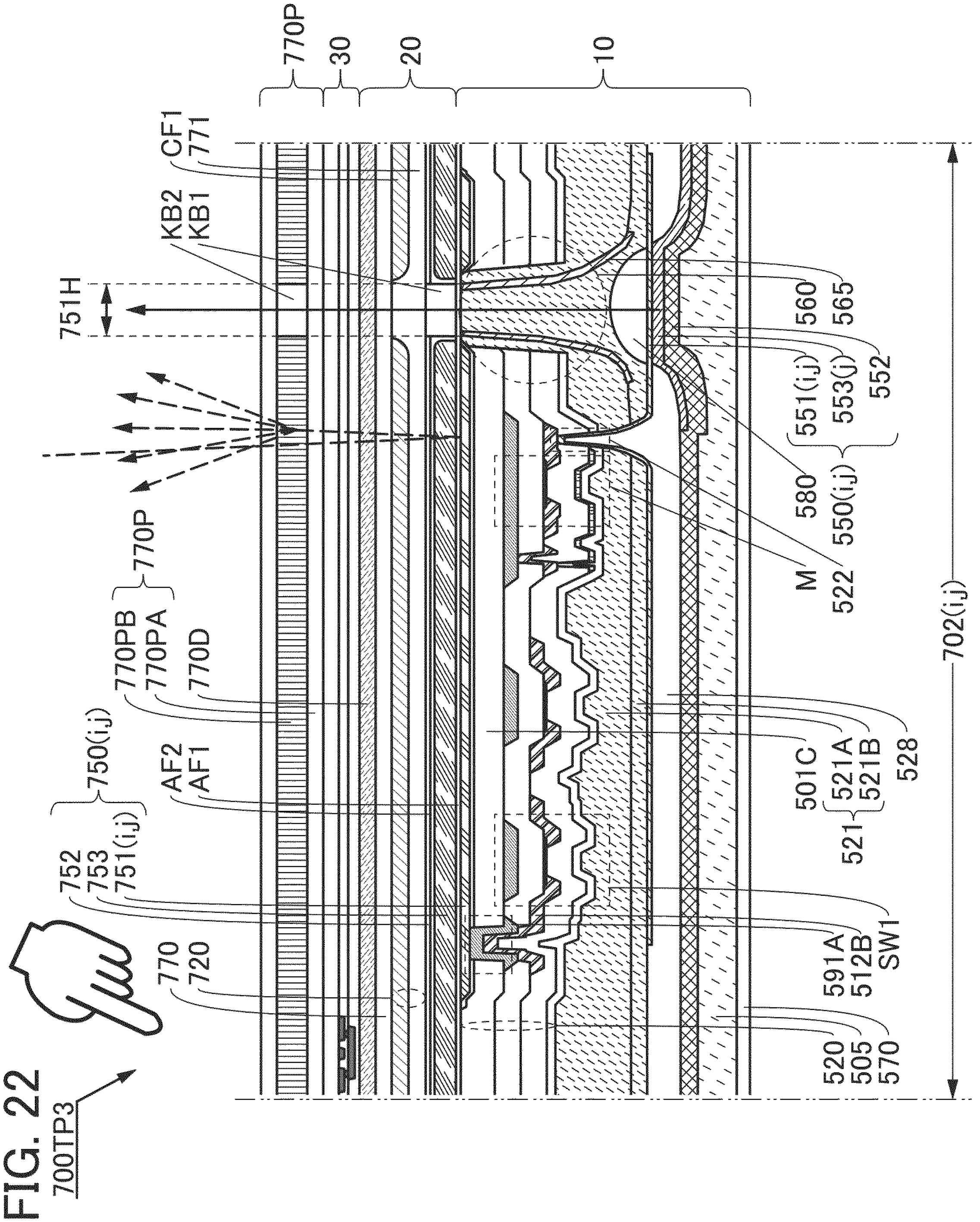
FIG. 22 illustrates a structure of an input/output panel of one embodiment.

FIG. 22 illustrates the structure of the input/output panel of one embodiment of the present invention. FIG. 22 is a cross-sectional view of a pixel included in the input/output panel.

Figure 23A:
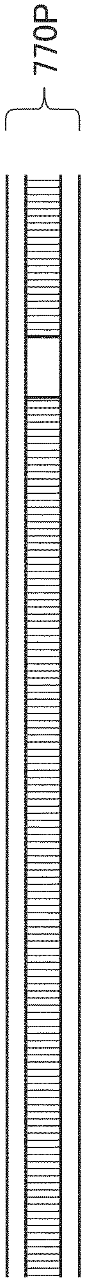
FIGS. 23A to 23D illustrate a structure of an input/output panel of one embodiment.
Figure 23B:
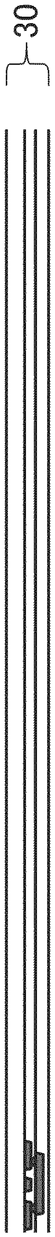
Figure 23C:
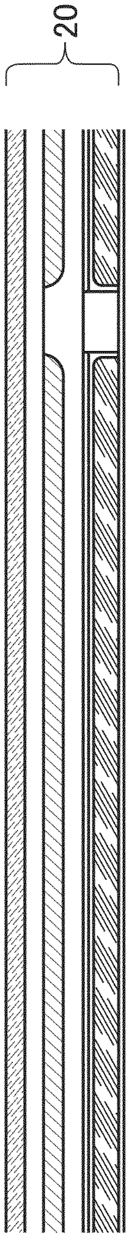
Figure 23D:
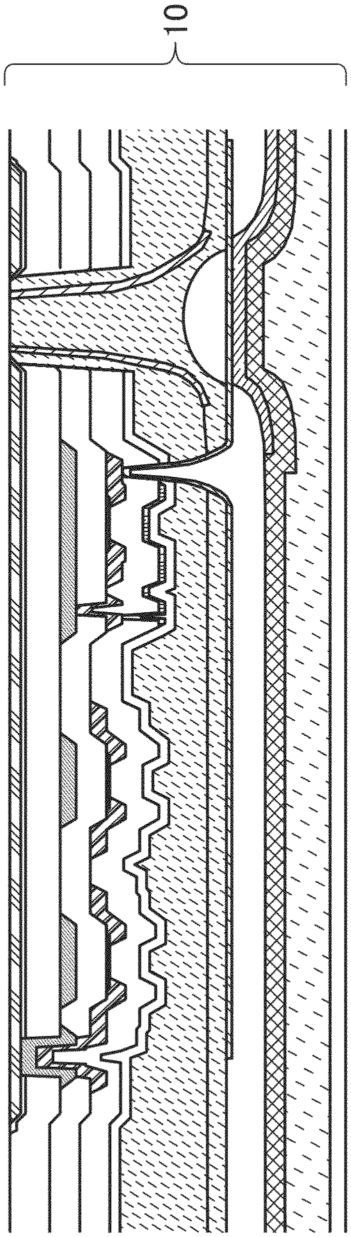

FIGS. 23A to 23D illustrate the structure of the input/output panel of one embodiment of the present invention. FIG. 23A is a cross-sectional view illustrating a structure of a functional film of the input/output panel illustrated in FIG. 22. FIG. 23B is a cross-sectional view illustrating a structure of an input unit. FIG. 23C is a cross-sectional view illustrating a structure of a second unit. FIG. 23D is a cross-sectional view illustrating a structure of a first unit.

Note that in this specification, an integral variable of 1 or more may be used for reference numerals. For example, "(p)" where p is an integral value of 1 or more may be used for part of a reference numeral that specifies any one of components (p components at a maximum). For another example, "(m,n)" where m and n are each an integral value of 1 or more may be used for part of a reference numeral that specifies any one of components (m×n components at a maximum).

An input/output panel 700TP3 described in this embodiment includes a pixel 702(*i,j*) (see FIG. 22). The input/output panel 700TP3 includes a first unit 501, a second unit 502, an input unit 503, and a functional film 770P (see FIGS. 23A to 23D). The first unit 501 includes a functional layer 520, and the second unit 502 includes a functional layer 720.

[Pixel 702(*i,j*)]

The pixel 702(*i,j*) includes part of the functional layer 520, a first display element 750(*i,j*), and a second display element 550(*i,j*) (see FIG. 22).

The functional layer 520 includes a first conductive film, a second conductive film, an insulating film 501C, and a pixel circuit 530(*i,j*). The pixel circuit 530(*i,j*) that is not illustrated includes the transistor M, for example. The functional layer 520 includes an optical element 560, a covering film 565, and a lens 580. The functional layer 520 includes an insulating film 528 and an insulating film 521. A stack including an insulating film 521A and an insulating film 521B can be used as the insulating film 521.

For example, a material whose refractive index is around 1.55 can be used for the insulating film 521A or the insulating film 521B. Alternatively, a material whose refractive index is around 1.6 can be used for the insulating film 521A or the insulating film 521B. Further alternatively, an acrylic resin or polyimide can be used for the insulating film 521A or the insulating film 521B.

The insulating film 501C includes a region positioned between the first conductive film and the second conductive film and has an opening 591A.

The first conductive film is electrically connected to the first display element 750(*i,j*). Specifically, the first conductive film is electrically connected to an electrode 751(*i,j*) of the first display element 750(*i,j*). The electrode 751(*i,j*) can be used as the first conductive film.

The second conductive film includes a region overlapping with the first conductive film. The second conductive film is electrically connected to the first conductive film through the opening 591A. For example, the conductive film 512B can be used as the second conductive film. The second conductive film is electrically connected to the pixel circuit 530(*i,j*). For example, a conductive film that functions as a source electrode or a drain electrode of a transistor used as the switch SW1 of the pixel circuit 530(*i,j*) can be used as the second conductive film. Note that the first conductive film electrically connected to the second conductive film in the opening 591A that is formed in the insulating film 501C can be referred to as a through electrode.

The second display element 550(*i,j*) is electrically connected to the pixel circuit 530 (*i, j*). The second display element 550(*i,j*) has a function of emitting light toward the functional layer 520. The second display element 550(*i,j*) has a function of emitting light toward the lens 580 or the optical element 560, for example.

The second display element 550(*i,j*) is provided so that display using the second display element 550(*i,j*) can be perceived from part of a region from which display using the first display element 750(*i,j*) can be perceived. For example, the electrode 751(*i,j*) of the first display element 750(*i,j*) includes a region 751H where light emitted from the second display element 550(*i,j*) is not blocked. Note that dashed arrows shown in FIG. 22 denote the directions in which external light is incident on and reflected by the first display element 750(*i,j*) that displays image data by controlling the intensity of external light reflection. In addition, a solid arrow shown in FIG. 22 denotes the direction in which the second display element 550(*i,j*) emits light to part of the region from which the display using the first display element 750(*i,j*) can be perceived.

Accordingly, display using the second display element can be seen from part of the region where display using the first display element can be seen. Alternatively, a user can see display without changing the attitude or the like of the input/output panel. Alternatively, an object color expressed by light reflected by the first display element and a light source color expressed by light emitted from the second display element can be mixed. Alternatively, an object color and a light source color can be used to display an image like a painting. As a result, a novel input/output panel that is highly convenient or reliable can be provided.

For example, the first display element 750(*i,j*) includes the electrode 751(*i,j*), an electrode 752, and a layer 753 containing a liquid crystal material. The first display element 750(*i,j*) further includes an alignment film AF1 and an alignment film AF2. Specifically, a reflective liquid crystal display element can be used as the first display element 750(*i,j*).

For example, a transparent conductive film whose refractive index is around 2.0 can be used as the electrode 752 or the electrode 751(*i,j*). Specifically, an oxide including indium, tin, and silicon can be used for the electrode 752 or the electrode 751(*i,j*). A material whose refractive index is around 1.6 can be used for the alignment film.

For example, the second display element 550(*i,j*) includes an electrode 551(*i,j*), an electrode 552, and a layer 553(*j*) containing a light-emitting material. The electrode 552 includes a region overlapping with the electrode 551(*i,j*). The layer 553(*j*) containing a light-emitting material includes a region positioned between the electrode 551(*i,j*) and the electrode 552. The electrode 551(*i,j*) is electrically connected to the pixel circuit 530(*i,j*) at a connection portion 522. Specifically, an organic EL element can be used as the second display element 550(*i,j*).

For example, a transparent conductive film having a refractive index of around 2.0 can be used as the electrode 551(*i,j*). Specifically, an oxide including indium, tin, and silicon can be used for the electrode 551(*i,j*). A material whose refractive index is around 1.8 can be used for the layer 553(*j*) containing a light-emitting material.

The optical element 560 has a light-transmitting property and includes a first region, a second region, and a third region.

The first region includes a region to which visible light is supplied from the second display element 550(*i,j*), the second region includes a region in contact with the covering film 565, and the third region has a function of emitting part of visible light. The third region has an area smaller than or equal to the area of the region in the first region to which visible light is supplied.

The covering film 565 has reflectivity with respect to visible light and has a function of reflecting part of visible light and supplying it to the third region.

For example, a metal can be used for the covering film 565. Specifically, a material containing silver can be used for the covering film 565. For example, a material containing silver, palladium, and the like or a material containing silver, copper, and the like can be used for the covering film 565.

[Lens 580]

A material that transmits visible light can be used for the lens 580. Alternatively, a material whose refractive index is greater than or equal to 1.3 and less than or equal to 2.5 can be used for the lens 580. For example, an inorganic material or an organic material can be used for the lens 580.

For example, a material including an oxide or a sulfide can be used for the lens 580.

Specifically, cerium oxide, hafnium oxide, lanthanum oxide, magnesium oxide, niobium oxide, tantalum oxide, titanium oxide, yttrium oxide, zinc oxide, an oxide including indium and tin, an oxide including indium, gallium, and zinc, or the like can be used for the lens 580. Alternatively, zinc sulfide or the like can be used for the lens 580.

The lens 580 can be formed using a material including resin, for example. Specifically, the lens 580 can be formed using a resin to which chlorine, boron, or iodine is introduced, a resin to which a heavy metal atom is introduced, a resin to which an aromatic ring is introduced, a resin to which sulfur is introduced, or the like. Alternatively, the lens 580 can be formed using a resin and a resin that includes a nanoparticle of a material whose refractive index is higher than that of the resin. Titanium oxide, zirconium oxide, or the like can be used for the nanoparticle.

[Functional Layer 720]

The functional layer 720 includes a region positioned between a substrate 770 and the insulating film 501C. The functional layer 720 further includes an insulating film 771 and a coloring film CF1.

The coloring film CF1 includes a region between the substrate 770 and the first display element 750(*i,j*).

The insulating film 771 includes a region positioned between the coloring film CF1 and the layer 753 containing a liquid crystal material. The insulating film 771 can reduce unevenness due to the thickness of the coloring film CF1. Furthermore, the insulating film 771 can prevent impurities from diffusing from the coloring film CF1 or the like to the layer 753 containing a liquid crystal material.

For example, an acrylic resin whose refractive index is around 1.55 can be used for the insulating film 771.

[Substrates 570 and 770]

The input/output panel described in this embodiment includes a substrate 570 and the substrate 770.

The substrate 770 includes a region overlapping with the substrate 570. The substrate 770 includes a region provided so that the functional layer 520 is positioned between the substrate 770 and the substrate 570.

The substrate 770 includes a region overlapping with the first display element 750 (*i, j*). For example, a material with low birefringence can be used for the region.

For example, a resin material whose refractive index is around 1.5 can be used for the substrate 770.

[Bonding Layer 505]

The input/output panel described in this embodiment also includes a bonding layer 505.

The bonding layer 505 includes a region sandwiched between the functional layer 520 and the substrate 770, and has a function of bonding the functional layer 520 and the substrate 770 together.

[Structure Bodies KB1 and KB2]

The input/output panel described in this embodiment includes a structure body KB1 and a structure body KB2.

The structure body KB1 has a function of providing a certain space between the functional layer 520 and the substrate 770. The structure body KB1 includes a region overlapping with the region 751H and has a light-transmitting property. Thus, light emitted from the second display element 550(*i,j*) can be supplied to one surface of the structure body KB1 and go out from the other surface.

Furthermore, the structure body KB1 includes a region overlapping with the optical element 560 and is formed using a material whose refractive index is different from that of a material used for the optical element 560 by 0.2 or less, for example. Accordingly, light emitted from the second display element can be used efficiently. Alternatively, the area of the second display element can be increased. Alternatively, the density of current flowing through the organic EL element can be decreased.

The structure body KB2 has a function of controlling the thickness of a polarizing layer 770PB to a predetermined thickness. The structure body KB2 includes a region overlapping with the second display element 550(*i,j*) and has a light-transmitting property.

Alternatively, a material that transmits light of a predetermined color can be used for the structure body KB1 or KB2. Thus, the structure body KB1 or KB2 can be used, for example, as a color filter. For example, a material that transmits blue light, green light, or red light can be used for the structure body KB1 or KB2. A material that transmits yellow light, white like, or the like can be used for the structure body KB1 or KB2.

Specifically, the structures KB1 and KB2 can include polyester, polyolefin, polyamide, polyimide, polycarbonate, polysiloxane, an acrylic resin, or the like, or a composite material of a plurality of kinds of resins selected from these. Alternatively, a photosensitive material may be used.

For example, an acrylic resin whose refractive index is around 1.5 can be used for the structure body KB1. An acrylic resin whose refractive index is around 1.55 can be used for the structure body KB2.

[Input Unit 503]

The input unit 503 includes a sensor element. The sensor element has a function of sensing an object that approaches a region overlapping with the pixel 702(*i,j*). Accordingly, a finger or the like close to a display portion can be used as a pointer to input positional data.

For example, a capacitive proximity sensor, an electromagnetic inductive proximity sensor, an optical proximity sensor, a resistive proximity sensor, a surface acoustic wave proximity sensor, or the like can be used in the input unit 503. Specifically, a surface capacitive proximity sensor, a projected capacitive proximity sensor, or an infrared proximity sensor can be used.

For example, a touch sensor which includes a capacitive proximity sensor and whose refractive index is around 1.6 can be used as the input unit 503.

[Functional Films 770D and 770P, and Other Components]

The input/output panel 700TP3 described in this embodiment includes a functional film 770D and the functional film 770P.

The functional film 770D includes a region overlapping with the first display element 750(*i,j*). The functional film 770D includes a region provided so that the first display element 750(*i,j*) is positioned between the functional film 770D and the functional layer 520.

For example, a light diffusion film can be used as the functional film 770D. Specifically, a material with a columnar structure having an axis along the direction intersecting a surface of a base can be used for the functional film 770D. In that case, light can be transmitted in the direction along the axis and scattered in other directions easily. For example, light reflected by the first display element 750(*i,j*) can be diffused.

The functional film 770P includes the polarizing layer 770PB, a retardation film 770PA, or the structure body KB2. The polarizing layer 770PB includes an opening, and the retardation film 770PA includes a region overlapping with the polarizing layer 770PB. Note that the structure body KB2 is provided in the opening.

For example, a dichromatic pigment, a liquid crystal material, and a resin can be used for the polarizing layer 770PB. The polarizing layer 770PB has a polarization property. In that case, the functional film 770P can be used as a polarizing plate.

The polarizing layer 770PB includes a region overlapping with the first display element 750(*i,j*), and the structure body KB2 includes a region overlapping with the second display element 550(*i,j*). Thus, a liquid crystal element can be used as the first display element. For example, a reflective liquid crystal display element can be used as the first display element. Light emitted from the second display element can be extracted efficiently. The density of current flowing through the organic EL element can be decreased. The reliability of the organic EL element can be increased.

For example, an anti-reflection film, a polarizing film, or a retardation film can be used as the functional film 770P. Specifically, a film containing a dichromatic pigment and a retardation film can be used as the functional film 770P.

Alternatively, an antistatic film preventing the attachment of a foreign substance, a water repellent film suppressing the attachment of stain, a hard coat film suppressing a scratch in use, or the like can be used as the functional film 770P.

A material whose refractive index is around 1.6 can be used for the light diffusion film, for example. A material whose refractive index is around 1.6 can be used for the retardation film 770PA.

At least part of this embodiment can be implemented in combination with any of the other embodiments and the other examples described in this specification as appropriate.

Embodiment 5

This embodiment will describe a display module that can be used in the electronic device of one embodiment of the present invention.

Figure 24A:
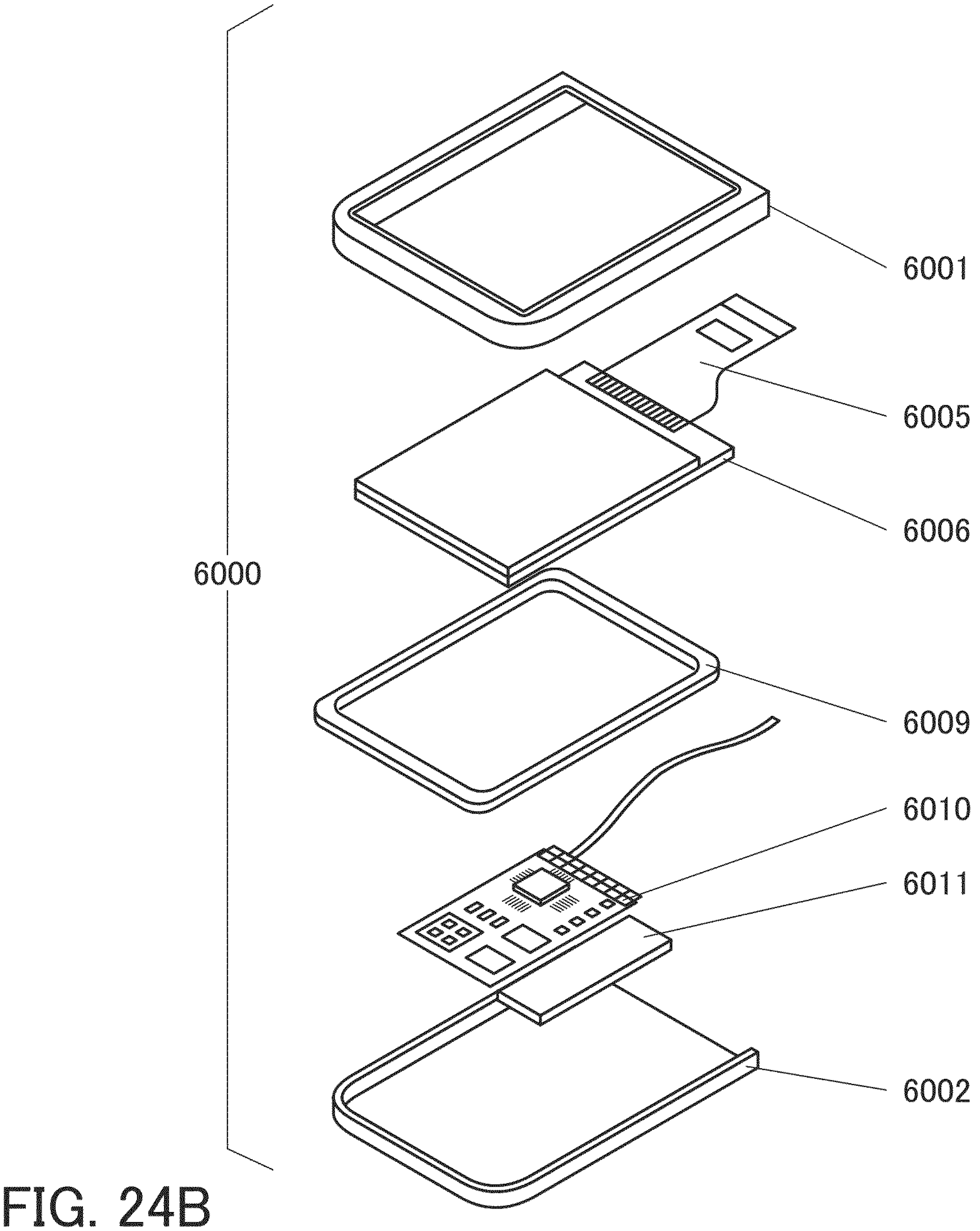
FIGS. 24A and 24B illustrate a structure example of a display module.

In a display module 6000 in FIG. 24A, a display panel 6006 connected to an FPC 6005, a frame 6009, a printed circuit board 6010, and a battery 6011 are provided between an upper cover 6001 and a lower cover 6002.

For example, the above-described display device manufactured using one embodiment of the present invention can be used for the display panel 6006. Thus, the display module can be manufactured with high yield.

The shapes and sizes of the upper cover 6001 and the lower cover 6002 can be changed as appropriate in accordance with the size of the display panel 6006.

A touch panel may be provided so as to overlap with the display panel 6006. The touch panel can be a resistive touch panel or a capacitive touch panel and may be formed to overlap with the display panel 6006. Instead of including the touch panel, the display panel 6006 can have a touch panel function.

The frame 6009 has a function of protecting the display panel 6006 and a function as an electromagnetic shield for blocking electromagnetic waves generated by the operation of the printed circuit board 6010. The frame 6009 may function as a radiator plate.

The printed circuit board 6010 has a power supply circuit and a signal processing circuit for outputting a video signal and a clock signal. As a power source for supplying power to the power supply circuit, an external commercial power source or the battery 6011 provided separately may be used. The battery 6011 can be omitted in the case of using a commercial power source.

The display module 6000 can be additionally provided with a member such as a polarizing plate, a retardation plate, or a prism sheet.

Figure 24B:
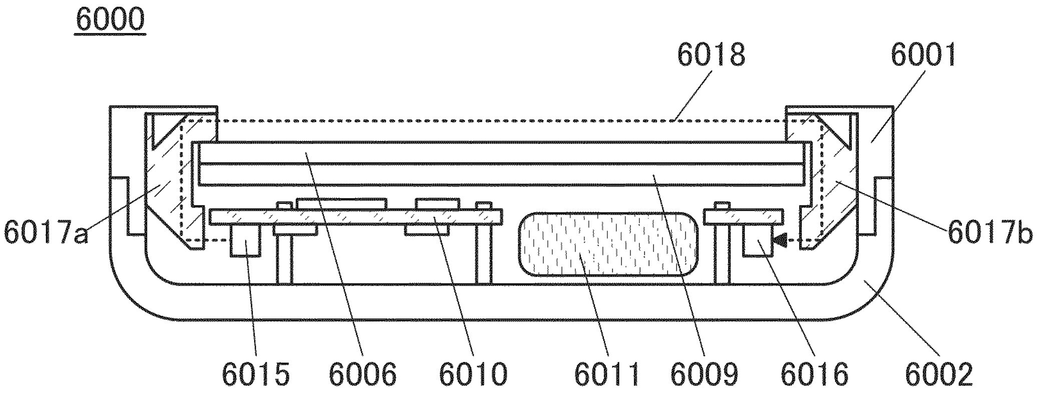

FIG. 24B is a schematic cross-sectional view of the display module 6000 with an optical touch sensor.

The display module 6000 includes a light-emitting portion 6015 and a light-receiving portion 6016 that are provided on the printed circuit board 6010. A pair of light guide portions (a light guide portion 6017*a* and a light guide portion 6017*b*) is provided in a region surrounded by the upper cover 6001 and the lower cover 6002.

The display panel 6006 overlaps with the printed circuit board 6010 and the battery 6011 with the frame 6009 located therebetween. The display panel 6006 and the frame 6009 are fixed to the light guide portion 6017*a* and the light guide portion 6017*b*.

Light 6018 emitted from the light-emitting portion 6015 travels over the display panel 6006 through the light guide portion 6017*a* and reaches the light-receiving portion 6016 through the light guide portion 6017*b*. For example, blocking of the light 6018 by an object such as a finger or a stylus can be detected as touch operation.

A plurality of light-emitting portions 6015 are provided along two adjacent sides of the display panel 6006, for example. A plurality of light-receiving portions 6016 are provided so as to face the light-emitting portions 6015. Accordingly, data on the position of touch operation can be obtained.

As the light-emitting portion 6015, a light source such as an LED element can be used. It is particularly preferable to use a light source that emits infrared light, which is not visually recognized by users and is harmless to users, as the light-emitting portion 6015.

As the light-receiving portion 6016, a photoelectric element that receives light emitted by the light-emitting portion 6015 and converts it into an electrical signal can be used. A photodiode that can receive infrared light can be favorably used.

For the light guide portions 6017*a* and 6017*b*, members that transmit at least the light 6018 can be used. With the use of the light guide portions 6017*a* and 6017*b*, the light-emitting portion 6015 and the light-receiving portion 6016 can be placed under the display panel 6006, and a malfunction of the touch sensor due to external light reaching the light-receiving portion 6016 can be prevented. It is particularly preferable to use a resin that absorbs visible light and transmits infrared light. This prevents the malfunction of the touch sensor more effectively.

At least part of this embodiment can be implemented in combination with any of the other embodiments and the other examples described in this specification as appropriate.

This application is based on Japanese Patent Application Serial No. 2016-173343 filed with Japan Patent Office on Sep. 6, 2016, the entire contents of which are hereby incorporated by reference.

What is claimed is:

1. An electronic device comprising:

a first housing comprising a first display portion;

a second housing comprising a second display portion;

a control portion; and a viewpoint detection portion, wherein the first display portion or the second display portion comprises a first region at which a user looks fixedly and a second region outside the first region, wherein the viewpoint detection portion is configured to detect the first region at which the user looks fixedly and output positional data of the first region to the control portion, wherein the control portion is configured to display a moving image in the first region and a still image in the second region, wherein a frame frequency of the second region is lower than a frame frequency of the first region, and wherein the first housing and the second housing are joined together to be capable of deforming in a mode of being folded with the first display portion and the second display portion overlapping with each other and in a mode of being opened with the first display portion and the second display portion exposed.

2. The electronic device according to claim 1, wherein at least one of the first display portion and the second display portion comprises a transistor, and wherein the transistor comprises a channel formation region comprising an oxide semiconductor.

* * * * *